US011966178B2

(12) United States Patent
Furuichi et al.

(10) Patent No.: US 11,966,178 B2
(45) **Date of Patent: *Apr. 23, 2024**

(54) HEATING DEVICE, BELT HEATING DEVICE, FIXING DEVICE, AND IMAGE FORMING APPARATUS

(71) Applicant: Ricoh Company, Ltd., Tokyo (JP)

(72) Inventors: Yuusuke Furuichi, Kanagawa (JP); Tomoya Adachi, Kanagawa (JP); Yukimichi Someya, Saitama (JP); Takayuki Seki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/943,222

(22) Filed: Sep. 13, 2022

(65) Prior Publication Data

US 2023/0004108 A1 Jan. 5, 2023

Related U.S. Application Data

(62) Division of application No. 17/259,450, filed as application No. PCT/JP2019/036396 on Sep. 17, 2019, now Pat. No. 11,550,249.

(30) Foreign Application Priority Data

Sep. 28, 2018 (JP) ................................ 2018-184393

(51) Int. Cl.
*G03G 15/20* (2006.01)

(52) U.S. Cl.
CPC ..... *G03G 15/2053* (2013.01); *G03G 15/2064* (2013.01); *G03G 2215/2038* (2013.01)

(58) Field of Classification Search
CPC ........... G03G 15/2017; G03G 15/2053; G03G 2215/2003
See application file for complete search history.

(56) References Cited

U.S. PATENT DOCUMENTS 9,798,505 B1 * 10/2017 Soriano ................. G06F 3/1285
11,550,249 B2 * 1/2023 Furuichi ............ G03G 15/2053
(Continued)

FOREIGN PATENT DOCUMENTS

CN 104656402 A 5/2015
CN 106125527 A 11/2016
(Continued)

OTHER PUBLICATIONS

International Search Report and Written Opinion dated Dec. 16, 2019 in PCT/JP2019/036396 filed on Sep. 17, 2019.
(Continued)

*Primary Examiner* — Thomas S Giampaolo, II
(74) *Attorney, Agent, or Firm* — XSENSUS LLP

(57) ABSTRACT

A heating device includes a heater, a holder, a device frame, a primary positioner, a secondary positioner, and a tertiary positioner. The heater includes a heat generator. The holder holds the heater. The device frame is configured to support the holder. The primary positioner is configured to position the heater and the holder in a longitudinal direction of the heater. The secondary positioner is configured to position the holder and the device frame in the longitudinal direction of the heater. The tertiary positioner is configured to position the device frame and a body of an image forming apparatus in the longitudinal direction of the heater. The primary positioner and one of the secondary positioner and the tertiary positioner are disposed on an identical side defined by a center of the heat generator in the longitudinal direction of the heater.

16 Claims, 31 Drawing Sheets

(56) References Cited

U.S. PATENT DOCUMENTS

| | | | | |
|---|---|---|---|---|
| 2002/0011476 | A1* | 1/2002 | Otsuka | H05B 3/0095 219/471 |
| 2002/0088789 | A1* | 7/2002 | Hirai | G03G 15/2064 219/216 |
| 2006/0153605 | A1 | 7/2006 | Nishiyama et al. | |
| 2016/0327900 | A1 | 11/2016 | Tanaka et al. | |
| 2018/0267458 | A1 | 9/2018 | Tanaka et al. | |
| 2019/0278206 | A1 | 9/2019 | Adachi et al. | |
| 2019/0286026 | A1 | 9/2019 | Furuichi et al. | |
| 2019/0286028 | A1 | 9/2019 | Furuichi et al. | |
| 2019/0286029 | A1 | 9/2019 | Adachi et al. | |
| 2019/0346808 | A1 | 11/2019 | Tanaka et al. | |
| 2019/0384211 | A1 | 12/2019 | Sako et al. | |
| 2020/0033766 | A1 | 1/2020 | Hase et al. | |
| 2020/0033767 | A1 | 1/2020 | Adachi et al. | |
| 2020/0033768 | A1 | 1/2020 | Furuichi et al. | |
| 2020/0033771 | A1 | 1/2020 | Furuichi et al. | |
| 2020/0033775 | A1 | 1/2020 | Inoue et al. | |
| 2020/0033776 | A1 | 1/2020 | Yoshinaga et al. | |
| 2020/0103796 | A1 | 4/2020 | Furuichi et al. | |

FOREIGN PATENT DOCUMENTS

| | | | |
|---|---|---|---|
| EP | 3 260 931 | A1 | 12/2017 |
| JP | 2001-356623 | A | 12/2001 |
| JP | 2016-212384 | A | 12/2016 |
| JP | 2017-181531 | A | 10/2017 |
| JP | 2020-52347 | A | 4/2020 |

OTHER PUBLICATIONS

Office Action dated May 10, 2022 in Japanese Patent Application No. 2018-184393, 3 pages.

Office Action issued Jan. 24, 2024 in Chinese Patent Application No. 201980062433.0, 8 pages.

* cited by examiner

HEATING DEVICE, BELT HEATING DEVICE, FIXING DEVICE, AND IMAGE FORMING APPARATUS

CROSS-REFERENCE TO RELATED APPLICATIONS

This application is a Divisional of U.S. application Ser. No. 17/259,450, filed Jan. 11, 2021, which is based on PCT filing PCT/JP2019/036396, filed Sep. 17, 2019, and claims priority to Japanese Patent Application JP 2018-184393 filed Sep. 28, 2018, the entire contents of each are incorporated herein by reference.

TECHNICAL FIELD

Embodiments of the present disclosure generally relate to a heating device, a belt heating device, a fixing device, and an image forming apparatus.

BACKGROUND ART

As a heating device used in an image forming apparatus, such as a copier or a printer, there are known, for example, a fixing device that fixes toner on a sheet under heat and a drying device that dries ink on a sheet.

In such a heating apparatus, a difference in thermal expansion coefficient between components may cause a decrease in positioning accuracy of the components.

To address such a problem, for example, JP-2016-212384-A proposes a fixing device that positions a heater holder, which holds a planer heater, in a longitudinal direction with respect to one of right and left frames.

CITATION LIST

Patent Literature

[PTL 1]
JP-2016-212384-A

SUMMARY OF INVENTION

Technical Problem

In the fixing device described in JP-2016-212384-A, one end of the heater in the longitudinal direction is abutted on the heater holder in a recess of the heater holder. However, the other end of the heater is free without being abutted on the heater holder so as not to restrain the expansion and contraction of the heater in the longitudinal direction due to a temperature change. Accordingly, the heater may rattle in the longitudinal direction in the recess and hamper the heater from being positioned relative to the heater holder with high accuracy.

Solution to Problem

In light of the above-described situation, according to an embodiment of the present disclosure, there is provided a heating device that includes a heater, a holder, a device frame, a primary positioner, a secondary positioner, and a tertiary positioner. The heater includes a heat generator. The holder holds the heater. The device frame is configured to support the holder. The primary positioner is configured to position the heater and the holder in a longitudinal direction of the heater. The secondary positioner is configured to position the holder and the device frame in the longitudinal direction of the heater. The tertiary positioner is configured to position the device frame and a body of an image forming apparatus in the longitudinal direction of the heater. The primary positioner and one of the secondary positioner and the tertiary positioner are disposed on an identical side defined by a center of the heat generator in the longitudinal direction of the heater.

Advantageous Effects of Invention

According to an embodiment of the present disclosure, a primary positioner and one of a secondary positioner and a tertiary positioner are disposed in an identical side defined by a center of a heat generator in a longitudinal direction of a heater. With such a configuration, even if the heater, a holder, and a device frame thermally expand, the heater, the holder, and the device frame expand and shrink from the identical side, on which positioning is performed, as a reference. Thus, relative positional shift on the identical side used as the reference can be reduced. Accordingly, the relative positional accuracy of the heating member, the holding member, and the device frame can be improved.

DESCRIPTION OF EMBODIMENTS

Figure 1:
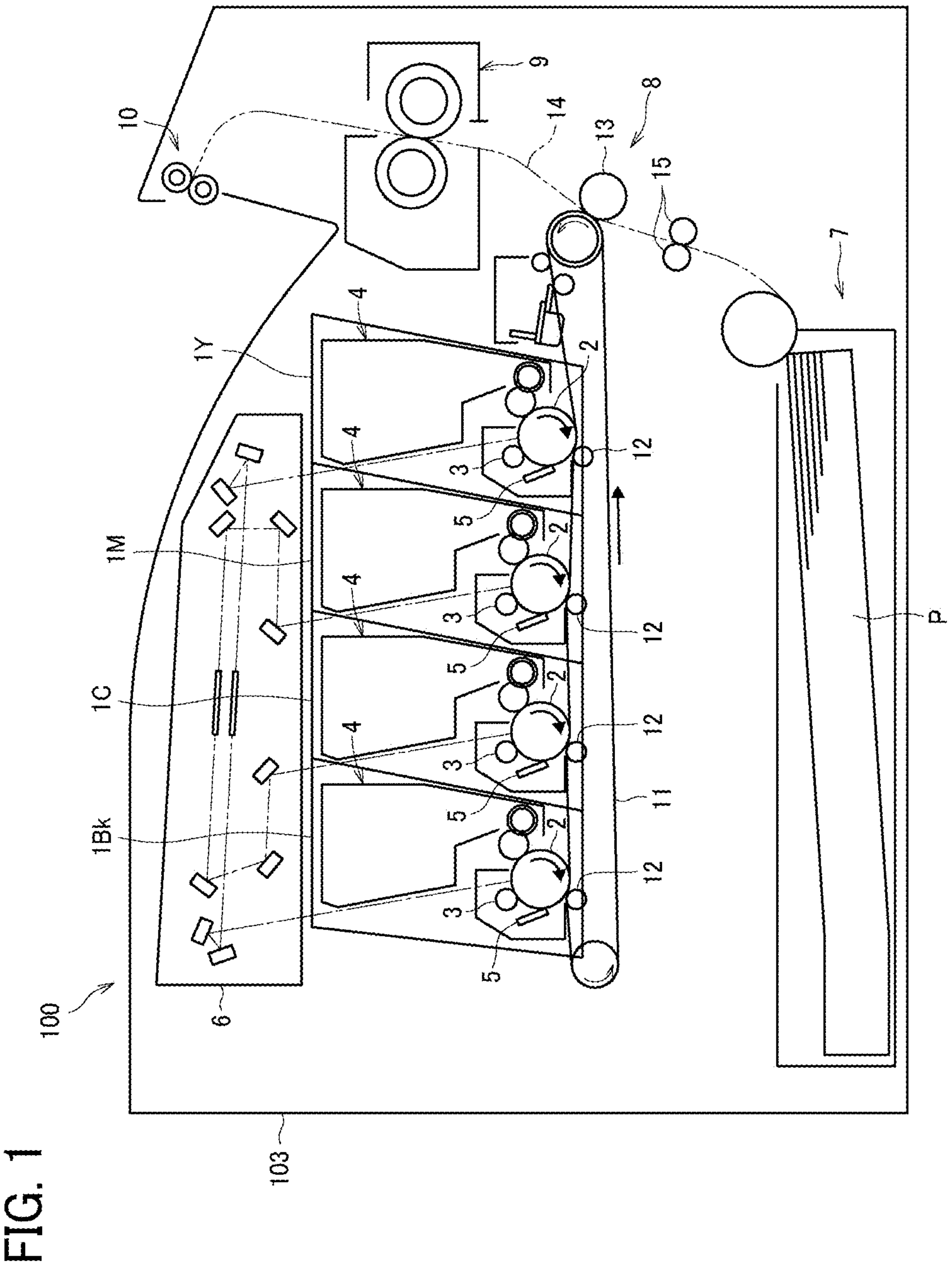
FIG. 1 is a schematic cross-sectional view of an image forming apparatus according to an embodiment of the present disclosure.

Referring to the attached drawings, the following describes a construction of an image forming apparatus 100 according to embodiments of the present disclosure. In the drawings for explaining the embodiments of the present disclosure, identical reference numerals are assigned to elements such as members and parts that have an identical function or an identical shape as long as differentiation is possible and a description of those elements is omitted once the description is provided.

FIG. 1 is a schematic cross-sectional view of the image forming apparatus 100 according to an embodiment of the present disclosure. The image forming apparatus 100 is a printer. Alternatively, the image forming apparatus 100 may be a copier, a facsimile machine, a multifunction peripheral (MFP) having at least two of printing, copying, facsimile, scanning, and plotter functions, or the like.

As illustrated in FIG. 1, the image forming apparatus 100 includes four image forming units 1Y, 1M, 1C, and 1Bk serving as image forming devices, respectively. The image forming units 1Y, 1M, 1C, and 1Bk are removably installed in a body 103 of the image forming apparatus 100. The image forming units 1Y, 1M, 1C, and 1Bk have a similar construction except that the image forming units 1Y, 1M, 1C, and 1Bk contain developers in different colors, that is, yellow, magenta, cyan, and black, respectively, which correspond to color separation components for a color image. For example, each of the image forming units 1Y, 1M, 1C, and 1Bk includes a photoconductor 2, a charger 3, a developing device 4, and a cleaner 5. The photoconductor 2 is drum-shaped and serves as an image bearer. The charger 3 charges a surface of the photoconductor 2. The developing device 4 supplies toner as a developer to the surface of the photoconductor 2 to form a toner image. The cleaner 5 cleans the surface of the photoconductor 2.

The image forming apparatus 100 further includes an exposure device 6, a sheet feeding device 7, a transfer device 8, a fixing device 9, and a sheet ejection device 10. The exposure device 6 exposes the surface of each of the photoconductors 2 and forms an electrostatic latent image thereon. The sheet feeding device 7 supplies a sheet P serving as a recording medium to the transfer device 8. The transfer device 8 transfers the toner image formed on each of the photoconductors 2 onto the sheet P. The fixing device 9 fixes the toner image transferred onto the sheet P thereon. The sheet ejection device 10 ejects the sheet P onto an outside of the image forming apparatus 100.

The transfer device 8 includes an intermediate transfer belt 11, four primary transfer rollers 12, and a secondary transfer roller 13. The intermediate transfer belt 11 is an endless belt serving as an intermediate transferor stretched taut across a plurality of rollers. The four primary transfer rollers 12 serve as primary transferors that transfer yellow, magenta, cyan, and black toner images formed on the photoconductors 2 onto the intermediate transfer belt 11, respectively, thus forming a full color toner image on the intermediate transfer belt 11. The secondary transfer roller 13 serves as a secondary transferor that transfers the full color toner image formed on the intermediate transfer belt 11 onto the sheet P. The plurality of primary transfer rollers 12 is pressed against the photoconductors 2, respectively, via the intermediate transfer belt 11. Thus, the intermediate transfer belt 11 contacts each of the photoconductors 2, forming a primary transfer nip therebetween. On the other hand, the secondary transfer roller 13 is pressed against one of the rollers across which the intermediate transfer belt 11 is stretched taut via the intermediate transfer belt 11. Thus, a secondary transfer nip is formed between the secondary transfer roller 13 and the intermediate transfer belt 11.

The image forming apparatus 100 accommodates a sheet conveyance path 14 through which the sheet P fed from the sheet feeding device 7 is conveyed. A timing roller pair 15 is disposed in the sheet conveyance path 14 at a position between the sheet feeding device 7 and the secondary transfer nip defined by the secondary transfer roller 13.

Referring to FIG. 1, a description is provided of printing processes performed by the image forming apparatus 100 having the construction described above.

When the image forming apparatus 100 receives an instruction to start printing, a driver drives and rotates the photoconductor 2 clockwise in FIG. 1 in each of the image forming units 1Y, 1M, 1C, and 1Bk. The charger 3 charges the surface of the photoconductor 2 uniformly at a high electric potential. Subsequently, the exposure device 6 exposes the surface of each of the photoconductors 2 based on image data created by an original scanner that reads an image on an original or print data instructed by a terminal, thus decreasing the electric potential of an exposed portion on the photoconductor 2 and forming an electrostatic latent image on the photoconductor 2. The developing device 4 supplies toner to the electrostatic latent image formed on the photoconductor 2, forming a toner image thereon.

When the toner images formed on the photoconductors 2 reach the primary transfer nips defined by the primary transfer rollers 12 in accordance with rotation of the photoconductors 2, the toner images formed on the photoconductors 2 are transferred onto the intermediate transfer belt 11 driven and rotated counterclockwise in FIG. 1 successively such that the toner images are superimposed on the intermediate transfer belt 11, forming a full color toner image thereon. Thereafter, the full color toner image formed on the intermediate transfer belt 11 is conveyed to the secondary transfer nip defined by the secondary transfer roller 13 in accordance with rotation of the intermediate transfer belt 11 and is transferred onto a sheet P conveyed to the secondary transfer nip. The sheet P is supplied from the sheet feeding device 7. The timing roller pair 15 temporarily halts the sheet P supplied from the sheet feeding device 7. Thereafter, the timing roller pair 15 conveys the sheet P to the secondary transfer nip at a time when the full color toner image formed on the intermediate transfer belt 11 reaches the secondary transfer nip. Accordingly, the full color toner image is transferred onto and borne on the sheet P. After the toner image is transferred onto the intermediate transfer belt 11, the cleaner 5 removes residual toner remained on the photoconductor 2 therefrom.

The sheet P transferred with the full color toner image is conveyed to the fixing device 9 that fixes the full color toner image on the sheet P. Thereafter, the sheet ejection device 10 ejects the sheet P onto the outside of the image forming apparatus 100, thus finishing a series of printing processes.

A description is provided of a construction of the fixing device 9.

Figure 2:
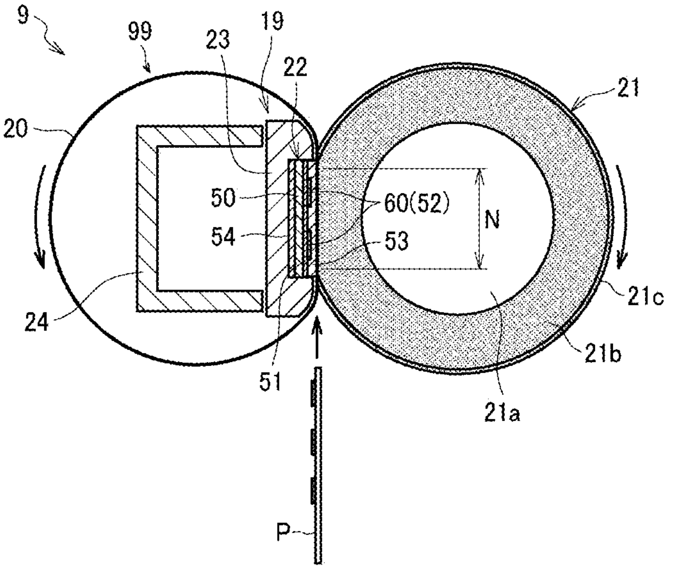
FIG. 2 is a schematic cross-sectional view of a fixing device incorporated in the image forming apparatus depicted in FIG. 1.

As illustrated in FIG. 2, the fixing device 9 according to this embodiment includes a fixing belt 20, a pressure roller 21, and a heating device 19. The fixing belt 20 is an endless belt serving as a fixing rotator or a fixing member. The pressure roller 21 serves as an opposed rotator or an opposed member that contacts an outer circumferential surface of the fixing belt 20 to form a fixing nip N between the fixing belt 20 and the pressure roller 21. The heating device 19 heats the fixing belt 20. The heating device 19 includes a heater 22, a heater holder 23, and a stay 24. The heater 22 is a planar or laminated heater and serves as a heater or a heating member. The heater holder 23 serves as a holder that holds or supports the heater 22. The stay 24 serves as a reinforcement that reinforces the heater holder 23 throughout an entire width of the heater holder 23 in a longitudinal direction thereof.

The fixing belt 20 includes a tubular base that is made of polyimide (PI) and has an outer diameter of 25 mm and a thickness in a range of from 40 micrometers to 120 micrometers, for example. The fixing belt 20 further includes a release layer serving as an outermost surface layer. The release layer is made of fluororesin, such as tetrafluoroethylene-perfluoroalkylvinylether copolymer (PFA) and polytetrafluoroethylene (PTFE), and has a thickness in a range of from 5 micrometers to 50 micrometers to enhance durability of the fixing belt 20 and facilitate separation of the sheet P and a foreign substance from the fixing belt 20. Optionally, an elastic layer that is made of rubber or the like and has a thickness in a range of from 50 micrometers to 500 micrometers may be interposed between the base and the release layer. The base of the fixing belt 20 may be made of heat resistant resin such as polyetheretherketone (PEEK) or metal such as nickel (Ni) and SUS stainless steel, instead of polyimide. An inner circumferential surface of the fixing belt 20 may be coated with polyimide, PTFE, or the like to produce a slide layer.

A detailed description is now given of a construction of the pressure roller 21. The pressure roller 21 has an outer diameter of 25 mm, for example. The pressure roller 21 includes a cored bar 21*a*, an elastic layer 21*b*, and a release layer 21*c*. The cored bar 21*a* is solid and made of metal such as iron. The elastic layer 21*b* coats the cored bar 21*a*. The release layer 21*c* coats an outer surface of the elastic layer 21*b*. The elastic layer 21*b* is made of silicone rubber and has a thickness of 3.5 mm, for example. In order to facilitate separation of the sheet P and the foreign substance from the pressure roller 21, the release layer 21*c* that is made of fluororesin and has a thickness of about 40 micrometers, for example, is preferably disposed on the outer surface of the elastic layer 21*b*.

A detailed description is now given of a construction of the heater 22. The heater 22 extends in a longitudinal direction thereof throughout an entire width of the fixing belt 20 in a width direction, that is, an axial direction, of the fixing belt 20. The heater 22 contacts the inner circumferential surface of the fixing belt 20. The heater 22 may not contact the fixing belt 20 or may be disposed opposite the fixing belt 20 indirectly via a low friction sheet or the like. However, the heater 22 that contacts the fixing belt 20 directly enhances conduction of heat from the heater 22 to the fixing belt 20. The heater 22 may contact the outer circumferential surface of the fixing belt 20. However, if the outer circumferential surface of the fixing belt 20 is brought into contact with the heater 22 and damaged, the fixing belt 20 may degrade quality of fixing the toner image on the sheet P. Hence, the heater 22 contacts the inner circumferential surface of the fixing belt 20 advantageously. The heater 22 includes a base layer 50, a first insulating layer 51, a conductor layer 52, a second insulating layer 53, and a third insulating layer 54. The first insulating layer 51, the conductor layer 52, and the second insulating layer 53 are layered on the base layer 50 in this order and sandwiched between the base layer 50 and the fixing nip N. The conductor layer 52 includes a heat generator 60. The third insulating layer 54 is layered on the base layer 50 and is disposed opposite the fixing nip N via the base layer 50.

A detailed description is now given of a construction of the heater holder 23 and the stay 24. The heater holder 23 and the stay 24 are disposed inside a loop formed by the fixing belt 20. The stay 24 includes a channel made of metal. Both lateral ends of the stay 24 in a longitudinal direction thereof are supported by side walls of the fixing device 9, respectively. The stay 24 supports a stay side face of the heater holder 23, that faces the stay 24 and is opposite a heater side face of the heater holder 23, that faces the heater 22. Accordingly, the stay 24 retains the heater 22 and the heater holder 23 to be immune from being bent substantially by pressure from the pressure roller 21, forming the fixing nip N between the fixing belt 20 and the pressure roller 21.

Since the heater holder 23 is subject to temperature increase by heat from the heater 22, the heater holder 23 is preferably made of a heat resistant material. For example, if the heater holder 23 is made of heat resistant resin having a decreased thermal conductivity, such as liquid crystal polymer (LCP) and PEEK, the heater holder 23 suppresses conduction of heat thereto from the heater 22, facilitating heating of the fixing belt 20.

A spring serving as a biasing member causes the fixing belt 20 and the pressure roller 21 to press against each other. Thus, the fixing nip N is formed between the fixing belt 20 and the pressure roller 21. As a driving force is transmitted to the pressure roller 21 from a driver disposed in the body 103 of the image forming apparatus 100, the pressure roller 21 serves as a driving roller that drives and rotates the fixing belt 20. The fixing belt 20 is driven and rotated by the pressure roller 21 as the pressure roller 21 rotates. While the fixing belt 20 rotates, the fixing belt 20 slides over the heater 22. In order to facilitate sliding of the fixing belt 20, a lubricant such as oil and grease may be interposed between the heater 22 and the fixing belt 20.

When printing starts, the driver drives and rotates the pressure roller 21 and the fixing belt 20 starts rotation in accordance with rotation of the pressure roller 21. Additionally, as power is supplied to the heater 22, the heater 22 heats the fixing belt 20. In a state in which the temperature of the fixing belt 20 reaches a predetermined target temperature (e.g., a fixing temperature), as the sheet P bearing the unfixed toner image is conveyed through the fixing nip N formed between the fixing belt 20 and the pressure roller 21 as illustrated in FIG. 2, the fixing belt 20 and the pressure roller 21 fix the unfixed toner image on the sheet P under heat and pressure.

Figure 3:
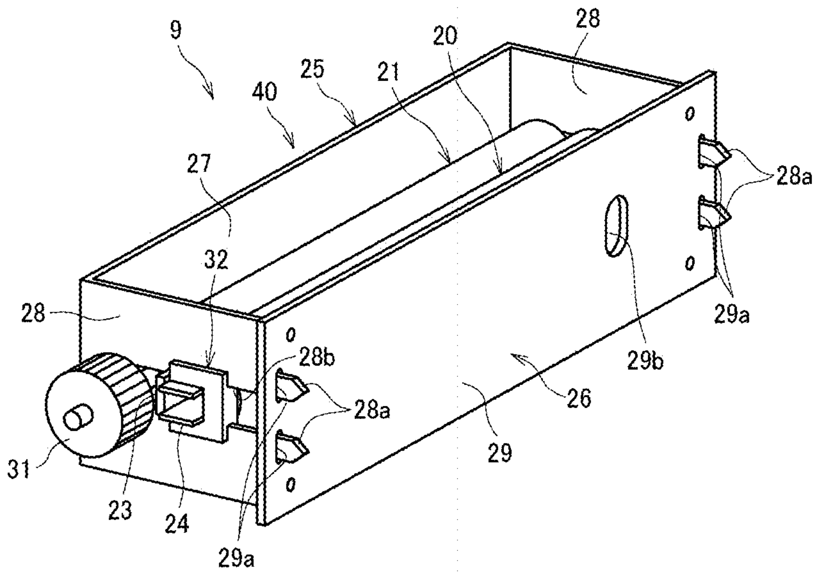
FIG. 3 is a perspective view of the fixing device depicted in FIG. 2.
Figure 4:
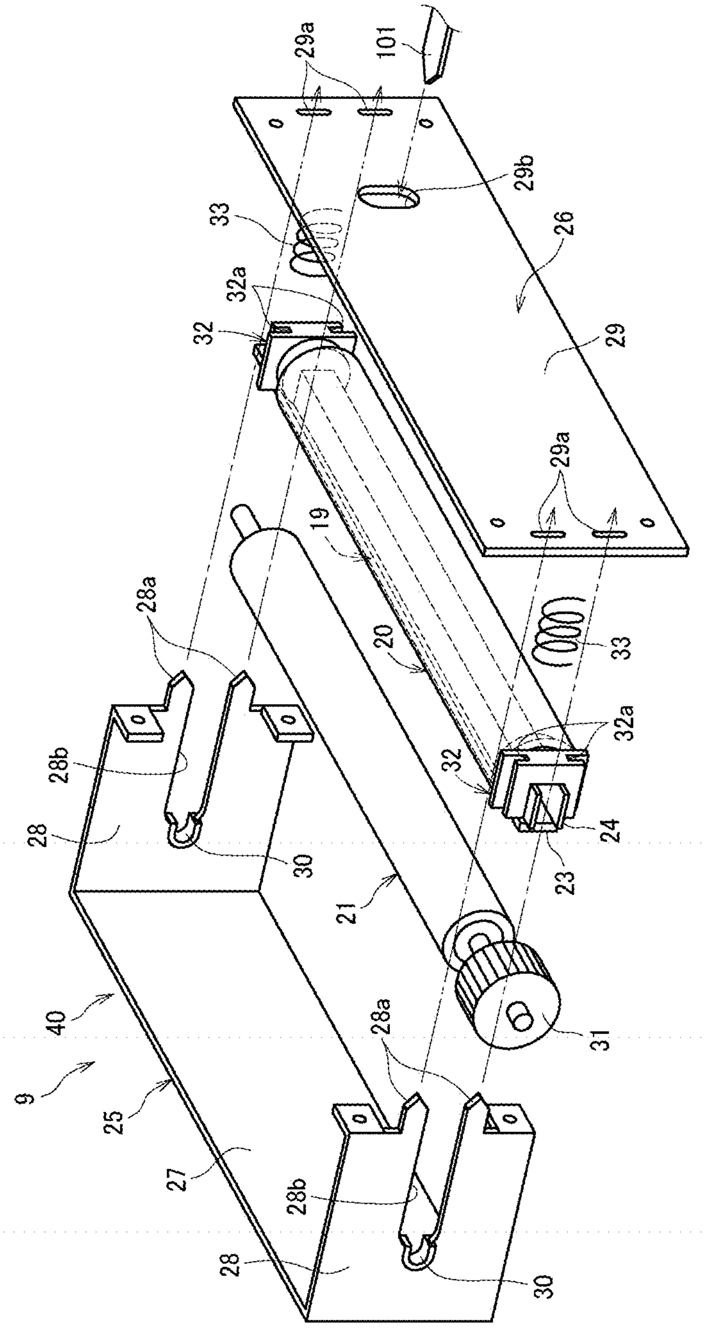
FIG. 4 is an exploded perspective view of the fixing device depicted in FIG. 3.

FIG. 3 is a perspective view of the fixing device 9. FIG. 4 is an exploded perspective view of the fixing device 9.

As illustrated in FIGS. 3 and 4, the fixing device 9 includes a device frame 40 that includes a first device frame 25 and a second device frame 26. The first device frame 25 includes a pair of side walls 28 and a front wall 27. The second device frame 26 includes a rear wall 29. The side walls 28 are disposed at one lateral end and another lateral end of the fixing belt 20, respectively, in the width direction of the fixing belt 20. The side walls 28 support both lateral ends of each of the pressure roller 21 and the heating device 19, respectively. Each of the side walls 28 includes a plurality of engaging projections 28*a*. As the engaging projections 28*a* engage engaging holes 29*a* penetrating through the rear wall 29, respectively, the first device frame 25 is coupled to the second device frame 26.

Each of the side walls 28 includes an insertion recess 28*b* through which a rotation shaft and the like of the pressure roller 21 are inserted. The insertion recess 28*b* is open at an opening that faces the rear wall 29 and closed at a bottom that is opposite the opening and serves as a contact portion. A bearing 30 that supports the rotation shaft of the pressure roller 21 is disposed at an end of the insertion recess 28*b*, that serves as the contact portion. As both lateral ends of the rotation shaft of the pressure roller 21 are attached to the bearings 30, respectively, the side walls 28 rotatably support the pressure roller 21.

A driving force transmission gear 31 serving as a driving force transmitter is disposed at one lateral end of the rotation shaft of the pressure roller 21 in an axial direction thereof. In a state in which the side walls 28 support the pressure roller 21, the driving force transmission gear 31 is exposed outside the side wall 28. Accordingly, when the fixing device 9 is installed in the body 103 of the image forming apparatus 100, the driving force transmission gear 31 is coupled to a gear disposed inside the body 103 of the image forming apparatus 100 so that the driving force transmission gear 31 transmits the driving force from the driver.

A pair of supports 32 that supports the fixing belt 20 and the like is disposed at both lateral ends of the heating device 19 in a longitudinal direction thereof, respectively. Each of the supports 32 is a device frame of the heating device 19 and a part of the device frame 40 of the fixing device 9. The supports 32 support the fixing belt 20 in a state in which the fixing belt 20 is not basically applied with tension in a circumferential direction thereof while the fixing belt 20 does not rotate, that is, by a free belt system. Each of the supports 32 includes guide grooves 32*a*. As the guide grooves 32*a* move along edges of the insertion recess 28*b* of the side wall 28, respectively, the support 32 is attached to the side wall 28.

A pair of springs 33 serving as a pair of biasing members is interposed between each of the supports 32 and the rear wall 29. As the springs 33 bias the supports 32 toward the pressure roller 21, respectively, the fixing belt 20 is pressed against the pressure roller 21 to form the fixing nip N between the fixing belt 20 and the pressure roller 21.

Figure 5:
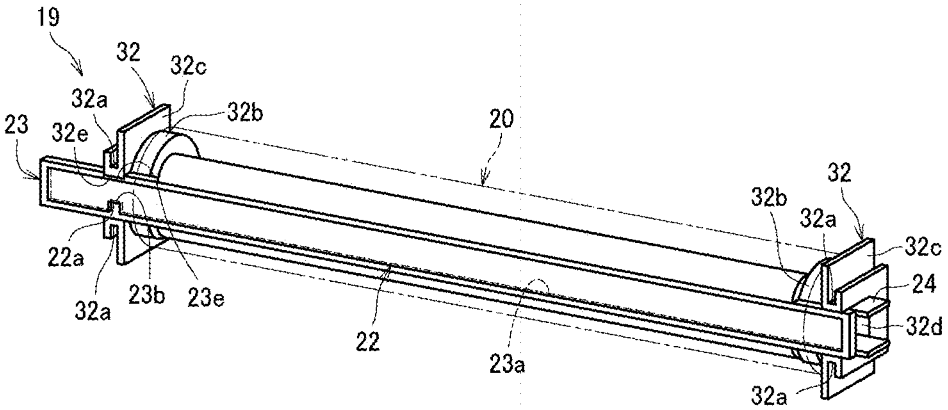
FIG. 5 is a perspective view of a heating device incorporated in the fixing device depicted in FIG. 2.
Figure 6:
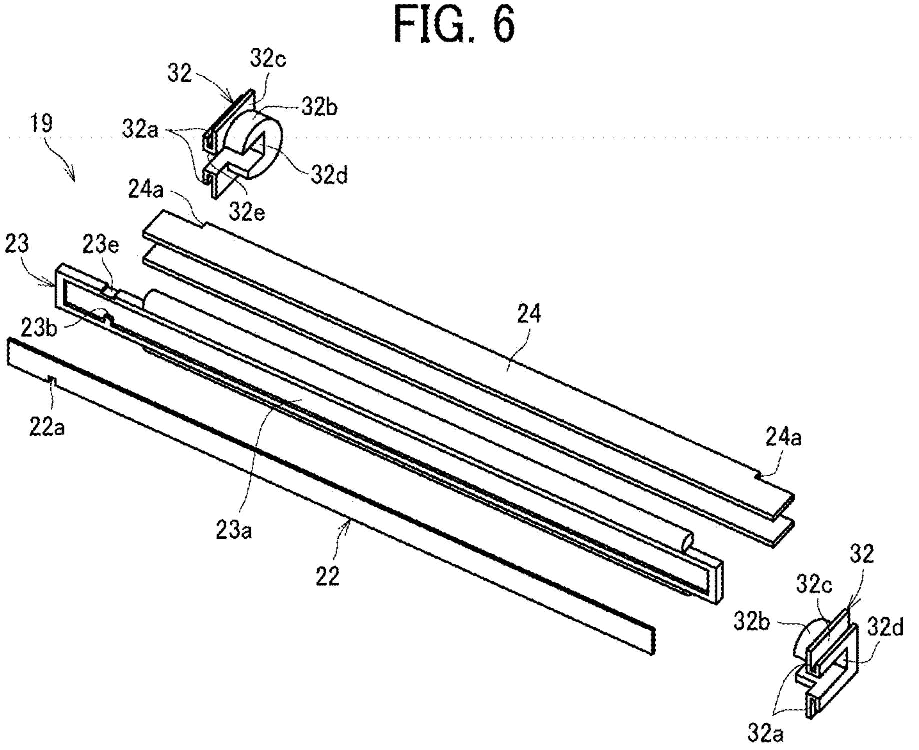
FIG. 6 is an exploded perspective view of the heating device depicted in FIG. 5.

FIG. 5 is a perspective view of the heating device 19. FIG. 6 is an exploded perspective view of the heating device 19.

As illustrated in FIGS. 5 and 6, the heater holder 23 includes an accommodating recess 23*a* disposed on a belt side face of the heater holder 23, that faces the fixing belt 20 and the fixing nip N. The accommodating recess 23*a* is rectangular and accommodates the heater 22. A connector described below sandwiches the heater 22 and the heater holder 23 in a state in which the accommodating recess 23*a* accommodates the heater 22, thus holding the heater 22.

Each of the pair of supports 32 includes a belt support 32*b*, a belt restrictor 32*c*, and a supporting recess 32*d*. The belt support 32*b* is C-shaped and inserted into the loop formed by the fixing belt 20, thus contacting the inner circumferential surface of the fixing belt 20 to support the fixing belt 20. The belt restrictor 32*c* is a flange that contacts an edge face of the fixing belt 20 to restrict motion (e.g., skew) of the fixing belt 20 in the width direction of the fixing belt 20. The supporting recess 32*d* is inserted with a lateral end of each of the heater holder 23 and the stay 24 in the longitudinal direction thereof, thus supporting the heater holder 23 and the stay 24.

Figure 7:
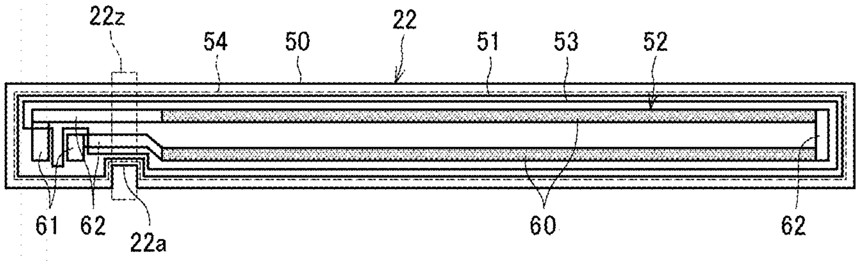
FIG. 7 is a plan view of a heater incorporated in the heating device depicted in FIG. 6.
Figure 8:
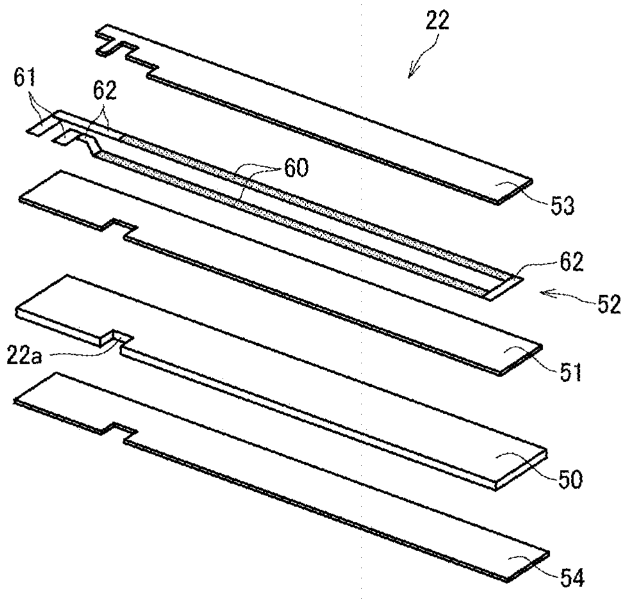
FIG. 8 is an exploded perspective view of the heater depicted in FIG. 7.

FIG. 7 is a plan view of the heater 22. FIG. 8 is an exploded perspective view of the heater 22. Hereinafter, a front side of the heater 22 defines a side that faces the fixing belt 20 and the fixing nip N. A back side of the heater 22 defines a side that faces the heater holder 23.

As illustrated in FIGS. 7 and 8, the heater 22 is constructed of a plurality of layers, that is, the base layer 50, the first insulating layer 51, the conductor layer 52, the second insulating layer 53, and the third insulating layer 54, which are laminated. The base layer 50 is platy. The first insulating layer 51 is mounted on the front side of the base layer 50. The conductor layer 52 is mounted on the front side of the first insulating layer 51. The second insulating layer 53 coats the front side of the conductor layer 52. The third insulating layer 54 is mounted on the back side of the base layer 50.

The conductor layer 52 includes a pair of heat generators 60, a pair of electrodes 61, and a plurality of feeders 62. Each of the heat generators 60 includes a laminated, resistive heat generator. Each of the electrodes 61 is coupled to one lateral end of each of the heat generators 60 in a longitudinal direction thereof through the feeder 62. The plurality of feeders 62 includes feeders, each of which couples the electrode 61 to the heat generator 60, and a feeder that couples the heat generators 60.

As illustrated in FIG. 7, at least a part of each of the electrodes 61 is not coated by the second insulating layer 53 and is exposed so that the electrodes 61 are connected to the connector described below.

For example, each of the heat generators 60 is produced as below. Silver-palladium (AgPd), glass powder, and the like are mixed into paste. The paste coats the base layer 50 by screen printing or the like. Thereafter, the base layer 50 is subject to firing. Alternatively, the heat generator 60 may be made of a resistive material such as a silver alloy (AgPt) and ruthenium oxide ($RuO_2$). According to this embodiment, the heat generators 60 are parallel to each other and extended in a longitudinal direction of the base layer 50. One end (e.g., a right end in FIG. 7) of one of the heat generators 60 is electrically connected to one end of another one of the heat generators 60 through the feeder 62. Another end (e.g., a left end in FIG. 7) of each of the heat generators 60 is electrically connected to the electrode 61 through another feeder 62. The feeders 62 are made of a conductor having a resistance value smaller than a resistance value of the heat generators 60. The feeders 62 and the electrodes 61 are made of a material prepared with silver (Ag), silver-palladium (AgPd), or the like by screen printing or the like.

The base layer 50 is made of metal such as stainless steel (e.g., SUS stainless steel), iron, and aluminum. Instead of metal, the base layer 50 may be made of ceramic, glass, or the like. If the base layer 50 is made of an insulating material such as ceramic, the first insulating layer 51 sandwiched between the base layer 50 and the conductor layer 52 may be omitted. Since metal has an enhanced durability against rapid heating and is processed readily, metal is preferably used to reduce manufacturing costs. Among metals, aluminum and copper are preferable because aluminum and copper attain an increased thermal conductivity and barely suffer from uneven temperature. Stainless steel is advantageous because stainless steel is manufactured at reduced costs compared to aluminum and copper.

Each of the first insulating layer 51, the second insulating layer 53, and the third insulating layer 54 is made of heat resistant glass. Alternatively, each of the first insulating layer 51, the second insulating layer 53, and the third insulating layer 54 may be made of ceramic, PI, or the like.

Figure 9:
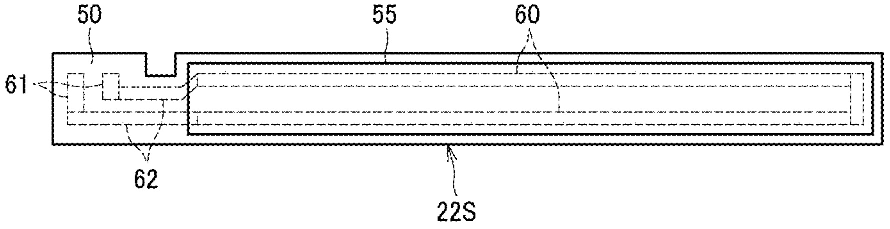
FIG. 9 is a back view of a heater installable in the heating device depicted in FIG. 6, that incorporates an increased thermal conductivity layer.

FIG. 9 illustrates a heater 22S incorporating an increased thermal conductivity layer 55. As illustrated in FIG. 9, a back face of the base layer 50 may mount the increased thermal conductivity layer 55 that attains a thermal conductivity greater than a thermal conductivity of the base layer 50. In this case, heat generated by the heater 22S dissipates through the increased thermal conductivity layer 55, suppressing uneven temperature of the heater 22S. In order to suppress uneven temperature of the heater 22S effectively, the increased thermal conductivity layer 55 preferably extends throughout an entire region of the heat generators 60 in the longitudinal direction and a short direction of the heat generators 60.

According to the embodiments, the heat generators 60, the electrodes 61, and the feeders 62 are made of an alloy of silver, palladium, or the like to attain a positive temperature coefficient (PTC) property. The PTC property defines a property in which the resistance value increases as the temperature increases, for example, a heater output decreases under a given voltage. The heat generators 60 having the PTC property start quickly with an increased output at low temperatures and suppress overheating with a decreased output at high temperatures. For example, if a temperature coefficient of resistance (TCR) of the PTC property is in a range of from about 300 ppm/° C. to about 4,000 ppm/° C., the heater 22 is manufactured at reduced costs while retaining a resistance value needed for the heater 22. The TCR is preferably in a range of from about 500 ppm/° C. to about 2,000 ppm/° C. The TCR is calculated by measuring the resistance value at 25 degrees Celsius and 125 degrees Celsius. For example, if the temperature increases by 100 degrees Celsius and the resistance value increases by 10%, the TCR is 1,000 ppm/° C.

According to the embodiments, a length of the heat generator 60 (e.g., a width in the longitudinal direction of the heat generator 60) is greater than a width of the sheet P. Accordingly, immediately after the heater 22 starts, fixing failure due to temperature decrease is prevented at each lateral end of the fixing belt 20 and a vicinity thereof in a width direction of the sheet P. Conversely, if the length of the heat generator 60 is excessively great, the fixing belt 20 may suffer from overheating in a non-conveyance span where the sheets P are not conveyed when the plurality of sheets P is conveyed continuously. To address this circumstance, the length of the heat generator 60 is determined properly. For example, according to the embodiments, the length of the heat generator 60 is preferably greater than a width of 216 mm of a sheet P of a letter size by a range of from 0.5 mm to 7.0 mm at one lateral end of the heat generator 60 in the longitudinal direction thereof. That is, the length of the heat generator 60 is in a range of from 217 mm to 230 mm. The letter size is a maximum sheet size (e.g., a maximum conveyance span of a recording medium) of sheets P that are conveyed through the fixing device 9. More preferably, the length of the heat generator 60 is greater than the maximum sheet size by a range of from 1.0 mm to 5.0 mm at one lateral end of the heat generator 60 in the longitudinal direction thereof. That is, the length of the heat generator 60 is in a range of from 219 mm to 226 mm. According to the embodiments, the length of the heat generator 60 is 221 mm.

Figure 10:
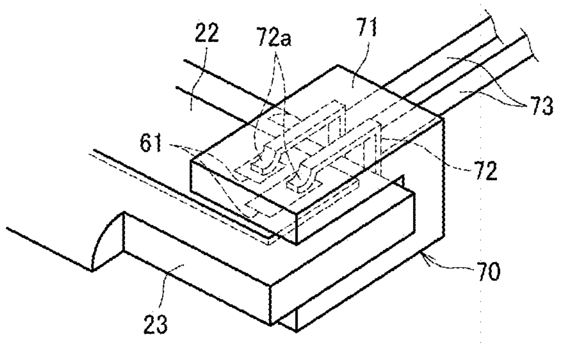
FIG. 10 is a perspective view of the heater and a heater holder incorporated in the heating device depicted in FIG. 6, illustrating a connector attached to the heater and the heater holder.

FIG. 10 is a perspective view of the heater 22 and the heater holder 23, illustrating a connector 70 attached thereto.

As illustrated in FIG. 10, the connector 70 includes a housing 71 made of resin and a contact terminal 72 anchored to the housing 71. The contact terminal 72 is a flat spring. The contact terminal 72 includes a pair of contacts **72*a* that contacts the electrodes 61 of the heater 22, respectively. The contact terminal 72 of the connector 70 is coupled to a harness 73** that supplies power.

As illustrated in FIG. 10, the connector 70 is attached to the heater 22 and the heater holder 23 such that the connector 70 sandwiches the heater 22 and the heater holder 23 together at the front side and the back side, respectively. Accordingly, each of the contacts **72*a* of the contact terminal 72 resiliently contacts or presses against the electrode 61 of the heater 22. Consequently, the heat generators 60 are electrically connected to a power supply disposed in the image forming apparatus 100 through the connector 70, allowing the power supply to supply power to the heat generators 60**.

As the heat generators 60 generate heat and the temperature of the heater 22 increases, the heater 22 may expand thermally. Thermal expansion and shrinkage of the heater 22 due to temperature change may be substantial in the longitudinal direction of the heater 22. To address this circumstance, the accommodating recess 23*a* of the heater holder 23, that accommodates the heater 22, is requested to allow the heater 22 to expand and shrink flexibly in the longitudinal direction thereof even when the temperature of the heater 22 changes. For example, the accommodating recess 23*a* is greater than the heater 22 in the longitudinal direction thereof to ensure a gap S depicted in FIG. 22 in the longitudinal direction of the heater holder 23.

However, if the gap S is provided between the heater 22 and the accommodating recess 23*a* in the longitudinal direction of the heater 22, when the heater 22 does not expand thermally, the heater 22 may tremble inside the accommodating recess 23*a*. As a result, a contact position where the electrode 61 contacts the contact terminal 72 of the connector 70 may shift, causing abrasion and faulty contact. Additionally, a heat generation span of the heater 22 may change in the longitudinal direction of the heater 22, degrading quality of fixing the toner image on the sheet P.

In a comparative fixing device, in order to prevent faulty contact of a heater with a connector, the heater mounts a projection that engages the connector to prevent shifting of a position of the heater relative to the connector. However, the projection mounted on the heater may upsize an external form of the heater, hindering downsizing of the heater. If the base layer 50 is made of metal available at reduced costs compared to ceramic to facilitate processing and reduce manufacturing costs and the like, the heater 22 is subject to expansion and shrinkage in the longitudinal direction thereof in a greater amount as the temperature of the heater 22 changes. To address this circumstance, the gap S between the heater 22 and the accommodating recess 23*a* in the longitudinal direction of the heater holder 23 is requested to be greater. Accordingly, in this case, the heater 22 may tremble inside the accommodating recess 23*a* in a greater amount.

Figure 11:
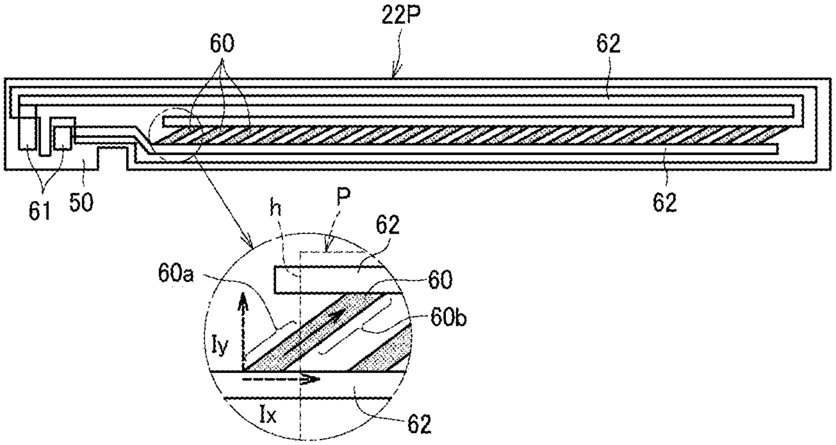
FIG. 11 is a plan view of a heater installable in the heating device depicted in FIG. 6, that incorporates heat generators connected in parallel.
Figure 22:
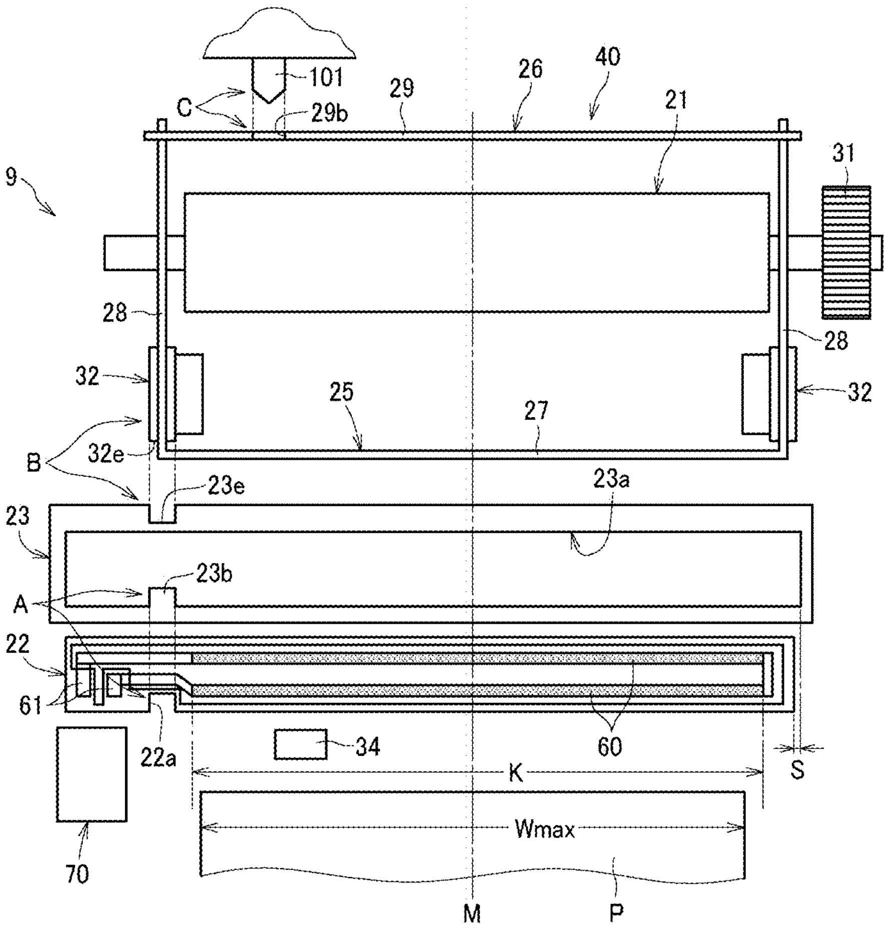
FIG. 22 is an exploded schematic diagram of the fixing device depicted in FIG. 2.

Additionally, like this embodiment, if a length K depicted in FIG. 22 of the heat generator 60 is greater than a maximum sheet size Wmax, the temperature of the heat generator 60 may increase substantially in the non-conveyance span where the sheet P is not conveyed, increasing thermal expansion of the heat generator 60 in the non-conveyance span. If the heat generator 60 has the PTC property, when the temperature of the heat generator 60 increases in the non-conveyance span, the resistance value of the heat generator 60 in the non-conveyance span increases. A heat generation amount of the heat generator 60 in the non-conveyance span is greater than a heat generation amount of the heat generator 60 in a conveyance span where the sheet P is conveyed, accelerating thermal expansion of the heater 22 in the non-conveyance span. In those cases, the heater 22 may tremble more seriously. Thermal expansion resulting from the PTC property is not limited to a pattern in which the two heat generators 60 are connected in series as illustrated in FIG. 7. FIG. 11 illustrates a heater 22P incorporating the heat generators 60 connected in parallel. For example, thermal expansion resulting from the PTC property may occur similarly also in a pattern in which the heat generators 60 are connected in parallel as illustrated in FIG. 11, at least if the heat generators 60 have a component Ix that flows an electric current in the longitudinal direction of the heat generators 60. FIG. 11 also illustrates a component Iy that flows the electric current in the short direction of the heat generators 60. For example, as illustrated in an enlarged view enclosed by an alternate long and short dash line in FIG. 11, when a sheet P is conveyed over the fixing belt 20 such that an edge h of the sheet P in the width direction thereof passes from one end of the identical heat generator 60 to another end of the identical heat generator 60, the electric current flows from a non-conveyance region 60*a* of the heat generator 60 where the sheet P is not conveyed and therefore the temperature is high to a conveyance region 60*b* of the heat generator 60 where the sheet P is conveyed and therefore the temperature is low, similarly to the pattern in which the heat generators 60 are connected in series. Accordingly, a heat generation amount of the non-conveyance region 60*a* is greater than a heat generation amount of the conveyance region 60*b*, accelerating thermal expansion of the non-conveyance region 60*a*.

To address this circumstance, according to the embodiments, the heater 22 is positioned in the longitudinal direction thereof so that the heater 22 does not tremble inside the accommodating recess 23*a*. A description is provided of a positioning mechanism that positions the heater 22 with respect to the heater holder 23.

As illustrated in FIGS. 5 and 6, the heater 22 includes a positioning depression 22*a* (e.g., a positioning hole or a positioning recess), serving as a positioner, disposed at one lateral end of the heater 22 in the longitudinal direction thereof. According to this embodiment, the positioning depression 22*a* is a recess depressed in a direction (e.g., a short direction) perpendicular to the longitudinal direction of the heater 22. A positioning projection 23*b* is disposed in the accommodating recess 23*a* of the heater holder 23. The positioning projection 23*b* serves as a positioner disposed in a counterpart, that engages the positioning depression 22*a* serving as a positioner disposed in the heater 22. In order to place the heater 22 in the accommodating recess 23*a*, the positioning depression 22*a* engages the positioning projection 23*b* to position the heater 22 with respect to the heater holder 23 in the longitudinal direction thereof. Accordingly, the heater 22 does not tremble inside the accommodating recess 23*a* in the longitudinal direction of the heater 22.

In each of the heater 22 and the heater holder 23, the positioner (e.g., the positioning depression 22*a* and the positioning projection 23*b*) is disposed at one lateral end of each of the heater 22 and the heater holder 23 in the longitudinal direction thereof, and is not disposed at another lateral end of each of the heater 22 and the heater holder 23. Thus, the positioner does not restrict thermal expansion and shrinkage of the heater 22 in the longitudinal direction thereof due to temperature change.

A description is provided of a test to examine advantages of a heater and a heater holder that include the positioners described above, respectively. For the test, the heater and the heater holder that had the positioners, respectively, and a heater and a heater holder that did not have the positioners, respectively, were prepared. The heaters and the heater holders were installed in an identical fixing device and an identical image forming apparatus in which 100 letter size sheets (e.g., plain paper) in portrait orientation were conveyed at a print speed of 50 ppm to output 50 sheets per minute.

Figure 12:
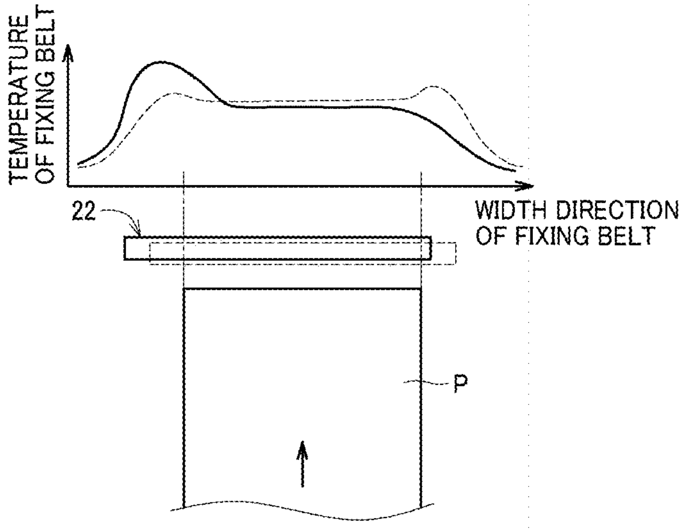
FIG. 12 is a graph illustrating a comparison between a temperature distribution of a fixing belt incorporated in the fixing device depicted in FIG. 2 when the heater shifts from a proper position and a temperature distribution of the fixing belt when the heater does not shift from the proper position.

As a result, with the heater and the heater holder that did not have the positioners, respectively, when two sheets were conveyed after conveyance of the sheets started, fixing failure appeared on a second sheet at one lateral end of the second sheet in a width direction thereof. When 50 sheets were conveyed, a release layer (e.g., a layer made of PFA) of a fixing belt peeled off. It is assumed that the heater illustrated in FIG. 12, as the heater 22, shifted leftward from a proper position indicated with a dotted line. Accordingly, a heat generation distribution of the heater 22 also shifted leftward, causing uneven temperature. For example, it is assumed that, at a right end of the fixing belt in a width direction thereof, a temperature of the fixing belt, that is indicated with a solid line, was lower than a proper temperature indicated with a dotted line, causing fixing failure at a right end of the sheet P. On the other hand, it is assumed that, at a left end of the fixing belt in the width direction thereof, conversely, the temperature of the fixing belt increased excessively, peeling the release layer as a surface layer off the fixing belt.

Conversely, with the heater and the heater holder that had the positioners, respectively, neither fixing failure nor damage to the fixing belt (e.g., peeling off of the surface layer) occurred.

Thus, the test confirmed that the positioners improved the accuracy of positioning of the heater with respect to the heater holder, preventing uneven temperature distribution that might cause fixing failure and damage to the fixing belt.

As illustrated in FIG. 7, according to this embodiment, the positioning depression 22*a* is disposed at one lateral end of the heater 22 in the longitudinal direction thereof where the electrodes 61 are disposed. Hence, the positioning depression 22*a* positions the heater 22 at the lateral end of the heater 22 where the electrodes 61 are disposed. Accordingly, even if the heater 22 thermally expands, the position of the electrodes 61 barely changes in the longitudinal direction of the heater 22, suppressing shifting of the electrodes 61 from the connector 70 effectively and thereby preventing abrasion and faulty contact of the electrodes 61 with the connector 70.

Figure 13:
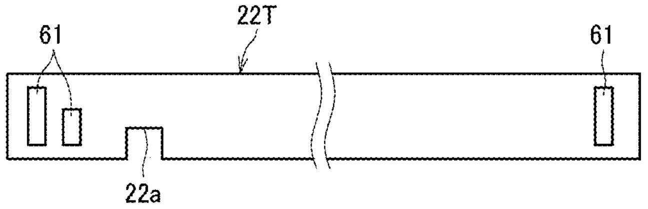
FIG. 13 is a plan view of a heater installable in the heating device depicted in FIG. 6, that incorporates electrodes disposed at both lateral ends of the heater.

FIG. 13 is a diagram of a heater 22T including the electrodes 61 disposed at both lateral ends of the heater 22T in a longitudinal direction thereof. The number of the electrodes 61 is different between one lateral end and another lateral end of the heater 22T in the longitudinal direction thereof. In order to suppress the number of the electrodes 61 that may shift from the connector 70, the positioning depression 22*a* is situated at one lateral end of the heater 22T in the longitudinal direction thereof, where the electrodes 61 in a greater number are situated.

Figure 14:
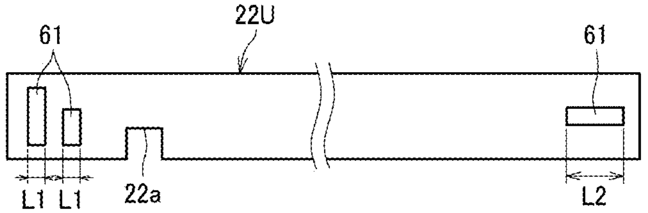
FIG. 14 is a plan view of a heater installable in the heating device depicted in FIG. 6, in which the electrodes disposed at one lateral end and another lateral end of the heater have different widths, respectively.

FIG. 14 is a diagram of a heater 22U in which a width L1 of the electrode 61 disposed at one lateral end of the heater 22U in a longitudinal direction thereof is different from a width L2 of the electrode 61 disposed at another lateral end of the heater 22U. For example, the width L1 is smaller than the width L2. The positioning depression 22*a* is situated at one lateral end of the heater 22U in the longitudinal direction thereof, where the electrodes 61, each of which has the width L1 that is smaller than the width L2, are situated. Accordingly, the positioning depression 22*a* suppresses shifting of the electrodes 61, each of which has the smaller width L1, from the connector 70, thus ensuring conductivity. In other words, the electrodes 61 disposed at one lateral end of the heater 22U in the longitudinal direction thereof, where the positioning depression 22*a* is disposed, are smaller in the longitudinal direction of the heater 22U than the electrode 61 disposed at another lateral end of the heater 22U, thus downsizing the heater 22U and reducing manufacturing costs.

As illustrated in FIG. 7, according to this embodiment, the positioning depression 22*a* is disposed in a span in the longitudinal direction of the heater 22 where the feeders 62 are disposed. That is, the positioning depression 22*a* is disposed opposite the feeders 62. Alternatively, the positioning depression 22*a* may be disposed in a span in the longitudinal direction of the heater 22 other than the span where the feeders 62 are disposed, for example, a span where the heat generators 60 or the electrodes 61 are disposed. However, in this case, the base layer 50 of the heater 22 may be upsized in the short direction of the heater 22, that is, a vertical direction in FIG. 7. In order to conduct heat to the sheet P sufficiently, each of the heat generators 60 is requested to have a predetermined length (e.g., 5 mm) or greater in the short direction of the heater 22. Similarly, in view of shifting from the connector 70, each of the electrodes 61 is requested to have a predetermined length (e.g., 5 mm) or greater in the short direction of the heater 22. Contrarily, the feeders 62 are free from such circumstances. Hence, the feeders 62 are allowed to have a relatively shortened length in the short direction of the heater 22 as long as electric conduction is possible. Accordingly, the positioning depression 22*a* is disposed opposite the feeders 62 that provide an increased flexibility in design to a certain extent, thus preventing upsizing of the heater 22 in the short direction thereof.

Figure 15:
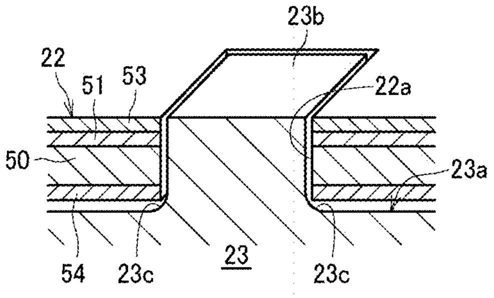
FIG. 15 is an enlarged perspective view of a positioning depression and a positioning projection incorporated in the heater and the heater holder depicted in FIG. 10, respectively.

FIG. 15 is an enlarged perspective view of the positioning depression 22*a* and the positioning projection 23*b*. In FIG. 15, an upper part illustrates the front side of the heater 22 and a lower part illustrates the back side of the heater 22.

As illustrated in FIG. 15, corner curved faces 23*c* may be disposed at a bottom of the positioning projection 23*b*. If the positioning projection 23*b* has the corner curved faces 23*c*, when the positioning projection 23*b* engages the positioning depression 22*a*, as illustrated in FIG. 15, since the positioning projection 23*b* has an increased width defined by the corner curved faces 23*c* in the longitudinal direction of the heater 22, the positioning projection 23*b* may not be inserted into the positioning depression 22*a* appropriately. Accordingly, a gap is produced between a back face of the heater 22 and a bottom face of the accommodating recess 23*a*. Consequently, the heater 22 is lifted from the bottom face of the accommodating recess 23*a* and therefore the heater holder 23 may not hold the heater 22 stably.

Figure 16:
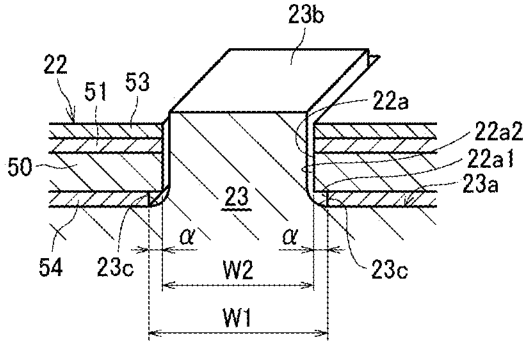
FIG. 16 is a perspective view of the positioning depression incorporated in the heater depicted in FIG. 10, that defines an opening having an increased width.

In order to suppress lifting of the heater 22, as illustrated in FIG. 16, the positioning depression 22*a* includes a first opening 22*a*1 into which the bottom of the positioning projection 23*b* is inserted and a second opening 22*a*2 abutting on the first opening 22*a*1. A width W1 of the first opening 22*a*1 is greater than a width W2 of the second opening 22*a*2 in the longitudinal direction of the heater 22. In an example illustrated in FIG. 16, the width W1 of the first opening 22*a*1 abutting on the third insulating layer 54 disposed in the back side is greater than the width W2 of the second opening 22*a*2 abutting on the base layer 50 by a width a in a range of from 0.1 mm to 5.0 mm at each lateral end of the positioning depression 22*a* in the longitudinal direction of the heater 22. Accordingly, the bottom (e.g., the corner curved faces 23*c*) of the positioning projection 23*b* is inserted into the positioning depression 22*a* appropriately, thus suppressing lifting of the heater 22 from the bottom face of the accommodating recess 23*a*.

Figure 17:
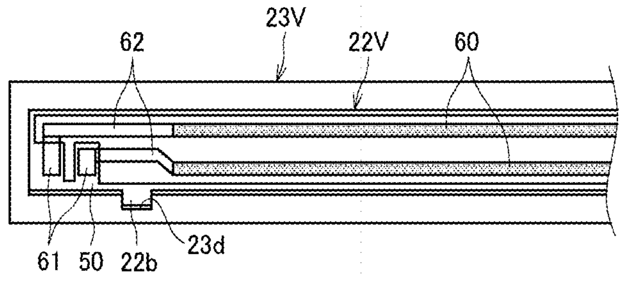
FIG. 17 is a plan view of a heater installable in the heating device depicted in FIG. 6, that incorporates a positioning projection.

According to this embodiment, the positioning depression 22*a* serving as a positioner is disposed in the heater 22 and the positioning projection 23*b* serving as a positioner is disposed in the heater holder 23. FIG. 17 is a diagram of a heater 22V incorporating a positioning projection 22*b* and a heater holder 23V incorporating a positioning depression 23*d*. Contrarily to the above-described constructions of the heater 22 and the heater holder 23, as illustrated in FIG. 17, the positioning projection 22*b* is disposed in the heater 22V and the positioning depression 23*d* is disposed in the heater holder 23V. Accordingly, the heater 22V is positioned with respect to the heater holder 23V in a longitudinal direction of the heater 22V. However, since the heater 22V incorporates the positioning projection 22*b*, an external form of the heater 22V is upsized, hindering downsizing. If the heater 22V is manufactured by cutting a plate such as a metallic plate, the positioning projection 22*b* of the heater 22V causes extra cutting of the plate, degrading yield and therefore increasing manufacturing costs. Hence, in view of downsizing and reducing manufacturing costs, in order to prevent upsizing of the external form of the heater 22, the positioning depression 22*a* is preferably employed as a positioner disposed in the heater 22.

Figure 18:
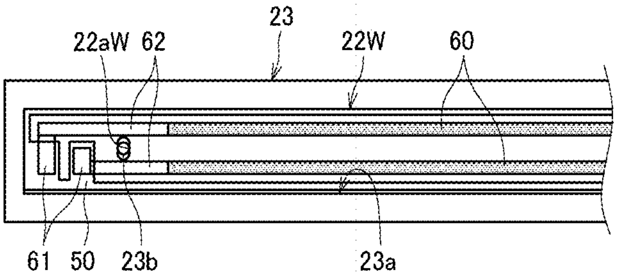
FIG. 18 is a plan view of a heater installable in the heating device depicted in FIG. 6, that incorporates a through hole.

FIG. 18 is a diagram of a heater 22W incorporating a through hole 22*a*W serving as a positioner, instead of the positioning depression 22*a* described above. The through hole 22*a*W penetrates through the heater 22W from the front side to the back side in a thickness direction of the heater 22W, that is, a direction perpendicular to a longitudinal direction of the heater 22W. The though hole 22*a*W defines openings on a front face and a back face of the heater 22W, respectively. For example, unlike the positioning depression 22*a* described above, the through hole 22*a*W does not define an opening on a side face of the heater 22W, that is perpendicular to the front face or the back face of the heater 22W. The through hole 22*a*W serving as a positioner contours an external form (e.g., the side face) of the heater 22W into a rectangle without projection and depression. Accordingly, the heater 22W is manufactured at reduced costs.

Figure 19:
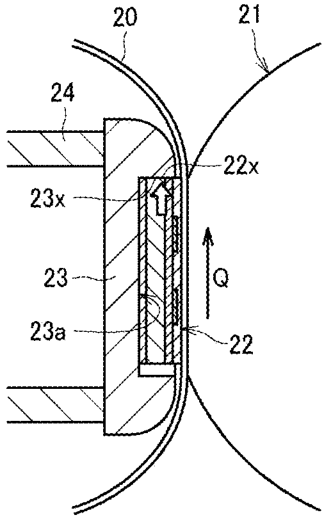
FIG. 19 is a cross-sectional view of the fixing belt and the heater incorporated in the fixing device depicted in FIG. 2, illustrating the heater positioned by the fixing belt in a short direction thereof as the fixing belt rotates.

As described above, thermal expansion and shrinkage of the heater 22 due to temperature change may be substantial in the longitudinal direction of the heater 22. However, thermal expansion and shrinkage of the heater 22 also occur in the short direction thereof. To address this circumstance, a gap is provided between the heater 22 and the accommodating recess 23*a* also in the short direction of the heater 22. Hence, when the heater 22 is placed in the accommodating recess 23*a*, somewhat looseness generates in the short direction of the heater 22. Although looseness is provided in the short direction of the heater 22 when the heater 22 is placed in the accommodating recess 23*a*, as the fixing belt 20 rotates, a rotation force of the fixing belt 20 positions the heater 22 with respect to the heater holder 23 in the short direction thereof. For example, as illustrated in FIG. 19, as the fixing belt 20 rotates, the rotation force of the fixing belt 20 pressingly moves the heater 22 downstream in a rotation direction Q of the fixing belt 20 (hereinafter referred to as a rotation direction of the fixing belt 20). Accordingly, a side face 22*x* of the heater 22, that is, a downstream face in the rotation direction of the fixing belt 20, comes into contact with a side face 23*x* of the accommodating recess 23*a*, that is disposed opposite the side face 22*x*, thus positioning the heater 22 with respect to the heater holder 23 in the short direction thereof.

Figure 20:
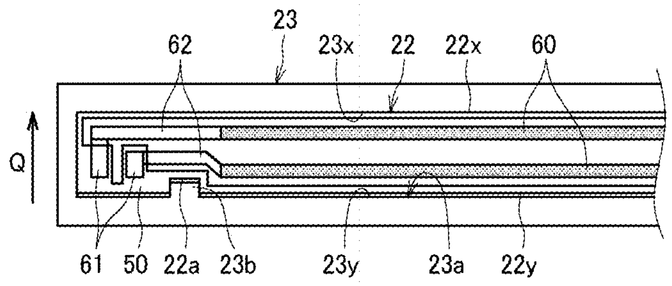
FIG. 20 is a plan view of the heater depicted in FIG. 7, illustrating the positioning depression disposed on an upstream face of the heater in a rotation direction of the fixing belt.

As illustrated in FIG. 20, according to this embodiment, the positioning depression 22*a* of the heater 22 and the positioning projection 23*b* of the heater holder 23 are mounted on a side face 22*y* of the heater 22 and a side face 23*y* of the heater holder 23, respectively. The side faces 22*y* and 23*y* are upstream faces (e.g., lower faces in FIG. 20) in the rotation direction Q of the fixing belt 20. Hence, according to this embodiment, the side faces 22*x* and 23*x* of the heater 22 and the heater holder 23, that is, downstream faces (e.g., upper faces in FIG. 20) in the rotation direction Q of the fixing belt 20, respectively, are straight planes without irregularities. Accordingly, as the fixing belt 20 rotates, the side faces 22*x* and 23*x* without irregularities position the heater 22 with respect to the heater holder 23 in the short direction thereof, improving accuracy of positioning of the heater 22 in the short direction thereof. Like an example illustrated in FIG. 18, similarly, in the heater 22W incorporating the through hole 22*a*W serving as a positioner, the side faces 22*x* and 23*x*, that is, the downstream faces in the rotation direction of the fixing belt 20, are straight planes without irregularities, respectively. In other words, in order to improve accuracy of positioning of the heater 22 with respect to the heater holder 23 in the short direction thereof, the positioners are disposed at positions other than the side faces 22*x* and 23*x* of the heater 22 and the heater holder 23, respectively, that is, the downstream faces in the rotation direction of the fixing belt 20.

Figure 21:
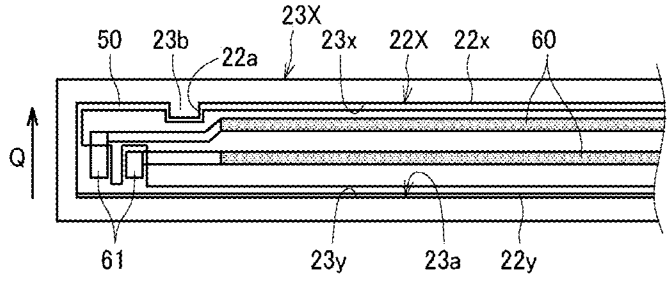
FIG. 21 is a plan view of a heater installable in the heating device depicted in FIG. 6, illustrating the positioning depression disposed on a downstream face of the heater in the rotation direction of the fixing belt.

FIG. 21 is a diagram of a heater 22X and a heater holder 23X incorporating the positioning depression 22*a* and the positioning projection 23*b* that are mounted on the side faces 22*x* and 23*x*, that is, the downstream faces in the rotation direction Q of the fixing belt 20, respectively, contrarily to the heater 22 and the heater holder 23 depicted in FIG. 20. As illustrated in an example depicted in FIG. 21, as the fixing belt 20 rotates, the positioning depression 22*a* engages the positioning projection 23*b* precisely.

A description is provided of a positioning mechanism that positions the heater holder 23 with respect to the device frame 40 as a body of the fixing device 9.

As illustrated in FIGS. 5 and 6, the heater holder 23 includes a positioning recess 23*e*, serving as a positioner, disposed at one lateral end of the heater holder 23 in the longitudinal direction thereof. The support 32 includes an engagement 32*e* illustrated in a left part in FIGS. 5 and 6. The engagement 32*e* engages the positioning recess 23*e*, positioning the heater holder 23 with respect to the support 32 in the longitudinal direction of the heater holder 23. Alternatively, contrarily to the embodiment depicted in FIGS. 5 and 6, the support 32 may include a positioning recess and the heater holder 23 may include an engagement that projects and engages the positioning recess. The support 32 illustrated in a right part in FIGS. 5 and 6 does not include the engagement 32*e* and therefore the heater holder 23 is not positioned with respect to the support 32 in the longitudinal direction of the heater holder 23. Thus, the support 32 does not restrict thermal expansion and shrinkage of the heater holder 23 in the longitudinal direction thereof due to temperature change.

As illustrated in FIG. 4, as the guide grooves 32*a* of the support 32 move along the insertion recess 28*b* of the side wall 28, the support 32 is attached to the side wall 28 disposed at each lateral end of the device frame 40 in a longitudinal direction thereof. The support 32, situated at a rear position in FIG. 4, of the two supports 32 illustrated in FIG. 4 positions the heater holder 23 in the longitudinal direction thereof. As the support 32 situated at the rear position in FIG. 4 is attached to the side wall 28, the heater holder 23 is positioned with respect to the side wall 28 in the longitudinal direction of the heater holder 23. Thus, the side wall 28 and the support 32 serve as positioners that position the heater holder 23 with respect to the body of the fixing device 9 in the longitudinal direction of the heater holder 23.

The stay 24 is not positioned with respect to the support 32 in the longitudinal direction of the stay 24. As illustrated in FIG. 6, the stay 24 includes steps 24*a* disposed at both lateral ends of the stay 24 in the longitudinal direction thereof, respectively. The steps 24*a* restrict motion (e.g., dropping) of the stay 24 with respect to the supports 32, respectively, in the longitudinal direction of the stay 24. A gap is provided between the step 24*a* and at least one of the supports 32 in the longitudinal direction of the stay 24. For example, the stay 24 is attached to the supports 32 such that looseness is provided between the stay 24 and each of the supports 32 in the longitudinal direction of the stay 24 so that the supports 32 do not restrict thermal expansion and shrinkage of the stay 24 in the longitudinal direction thereof due to temperature change. That is, the stay 24 is not positioned with respect to one of the supports 32.

A description is provided of a positioning mechanism that positions the body of the fixing device 9 (e.g., the device frame 40) with respect to the body 103 of the image forming apparatus 100.

As illustrated in FIG. 4, a hole 29*b* is disposed at one lateral end of the rear wall 29 of the second device frame 26 in a longitudinal direction of the second device frame 26. The hole 29*b* serves as a positioner that positions the body of the fixing device 9 with respect to the body 103 of the image forming apparatus 100. When the body of the fixing device 9 is installed in the body 103 of the image forming apparatus 100, a projection 101 serving as a positioner disposed in the body 103 of the image forming apparatus 100 is inserted into the hole 29*b* of the fixing device 9. Accordingly, the projection 101 engages the hole 29*b*, positioning the body of the fixing device 9 with respect to the body 103 of the image forming apparatus 100 in a longitudinal direction of the fixing device 9, that is, the width direction or the axial direction of the fixing belt 20. Alternatively, contrarily to the embodiment depicted in FIG. 4, a projection serving as a positioner may be disposed in the body of the fixing device 9 and a hole that engages the projection may be disposed in the body 103 of the image forming apparatus 100. Further, the hole serving as a positioner may be a through hole or a recess having a bottom. Although the hole 29*b* serving as a positioner is disposed at one lateral end of the rear wall 29 in the longitudinal direction of the second device frame 26, a positioner is not disposed at another lateral end of the rear wall 29. Thus, the second device frame 26 does not restrict thermal expansion and shrinkage of the body of the fixing device 9 in the longitudinal direction thereof due to temperature change.

As described above, according to the embodiments, the positioners position the heater 22 with respect to the heater holder 23, the heater holder 23 with respect to the body of the fixing device 9, and the body of the fixing device 9 with respect to the body 103 of the image forming apparatus 100, respectively, in the longitudinal direction of the heater holder 23. A description is provided of positional relations between the positioners. In the description below, the positioner that positions the heater 22 with respect to the heater holder 23 is referred to as a primary positioner. The positioner that positions the heater holder 23 with respect to the body of the fixing device 9 is referred to as a secondary positioner. The positioner that positions the body of the fixing device 9 with respect to the body 103 of the image forming apparatus 100 is referred to as a tertiary positioner.

FIG. 22 is an exploded schematic diagram of the fixing device 9. FIG. 22 omits illustration of the fixing belt 20.

As illustrated in FIG. 22, a primary positioner A (e.g., the positioning depression 22*a* and the positioning projection 23*b*), a secondary positioner B (e.g., the positioning recess 23*e* and the engagement 32*e*), and a tertiary positioner C (e.g., the hole 29*b* and the projection 101) are disposed in an identical side (e.g., a left side in FIG. 22) defined by a center M of the heat generator 60 in the longitudinal direction of the heater 22. The primary positioner A, the secondary positioner B, and the tertiary positioner C are disposed in the identical side, improving accuracy of relative positioning of the heater 22, the heater holder 23, and the body of the fixing device 9 (e.g., the device frame 40). For example, even if the heater 22, the heater holder 23, and the body of the fixing device 9 thermally expand, the heater 22, the heater holder 23, and the body of the fixing device 9 expand and shrink from the identical side, that is, one lateral end of the fixing device 9 in the longitudinal direction thereof where positioning is performed. Accordingly, relative positional shift is suppressed at one lateral end of the fixing device 9 in the longitudinal direction thereof where positioning is performed. For example, according to this embodiment, the primary positioner A and the secondary positioner B are situated at an identical position in the longitudinal direction of the heater 22 and overlap. Accordingly, the primary positioner A and the secondary positioner B improve accuracy of positioning of the heater 22 and the heater holder 23 with respect to the left, side wall 28 in FIG. 22. Consequently, at one lateral end of the fixing device 9 in the longitudinal direction thereof where positioning is performed, the heat generators 60 are positioned with respect to the sheet P with an improved accuracy, enhancing quality of fixing the toner image on the sheet P.

Additionally, as illustrated in FIG. 22, a thermistor 34 serving as a temperature sensor that detects the temperature of the fixing belt 20 is also disposed in the identical side defined by the center M of the heat generators 60 in the longitudinal direction of the heater 22, where the primary positioner A, the secondary positioner B, and the tertiary positioner C are disposed, thus improving accuracy of positioning of the thermistor 34 with respect to the heater 22. Accordingly, the temperature of the fixing belt 20 is controlled precisely based on a detection result provided by the thermistor 34. The temperature sensor that detects the temperature of the fixing belt 20 may be a contact type sensor that contacts the fixing belt 20 or a non-contact type sensor that does not contact the fixing belt 20. Instead of the temperature sensor that detects the temperature of the fixing belt 20, a temperature sensor that detects the temperature of the pressure roller 21 may be employed. If the temperature sensor is in contact with or disposed in proximity to the back face of the heater 22, like this embodiment, the back face of the base layer 50 preferably mounts an insulating layer (e.g., the third insulating layer 54).

Figure 23:
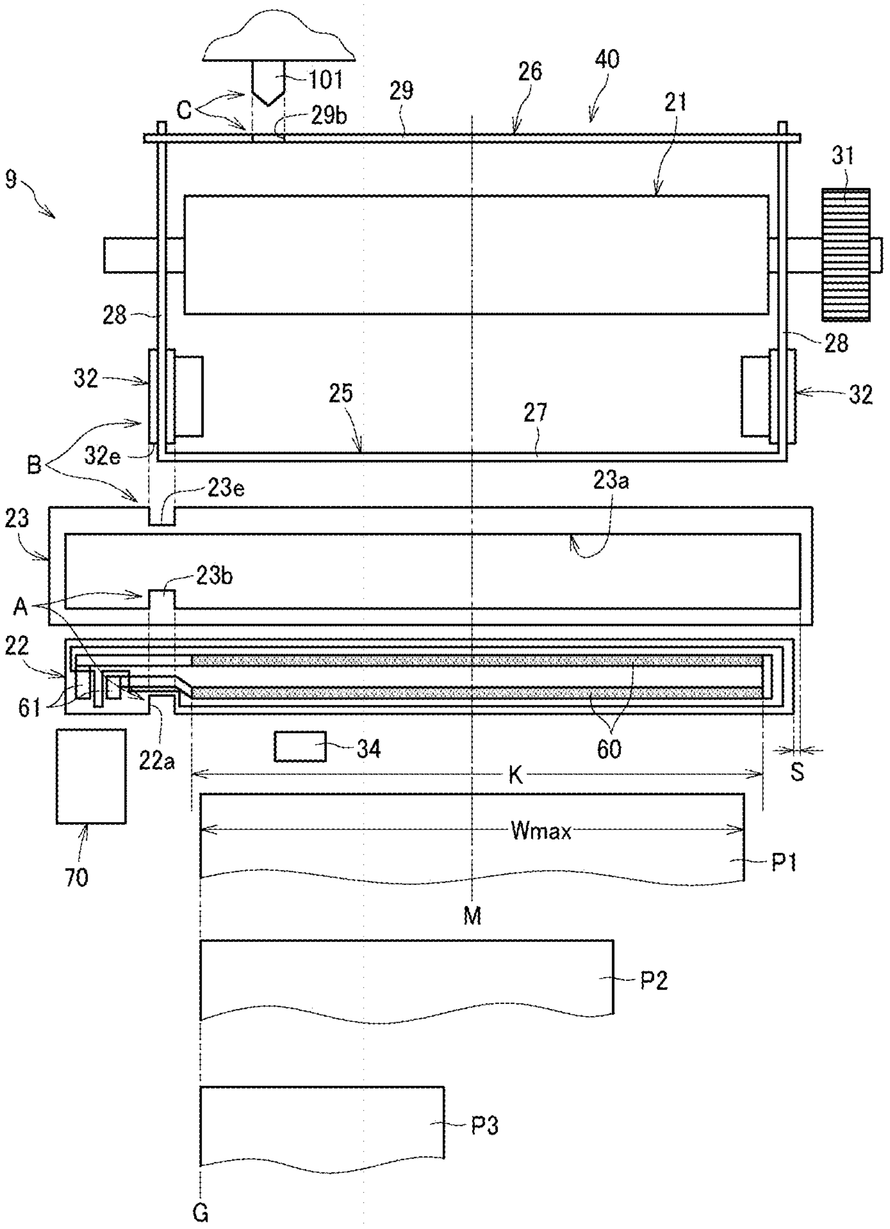
FIG. 23 is an exploded schematic diagram of the fixing device depicted in FIG. 2, illustrating a positioning margin for sheets and positioners that are disposed in an identical side of the fixing device.

FIG. 23 is a diagram of the fixing device 9 in which sheets P1, P2, and P3 having different widths in the width direction of the fixing belt 20, respectively, are conveyed. The sheets P1, P2, and P3 are aligned and conveyed along a positioning margin G disposed at one lateral end (e.g., a left end in FIG. 23) of the fixing belt 20 in the width direction thereof. The positioning margin G for the sheets P1, P2, and P3 is also preferably disposed in the identical side defined by the center M of the heat generators 60 in the longitudinal direction of the heater 22, where the primary positioner A, the secondary positioner B, and the tertiary positioner C are disposed. Accordingly, the positioning margin G improves accuracy of positioning of the sheets P1, P2, and P3 with respect to the heater 22, enhancing quality of fixing the toner image on each of the sheets P1, P2, and P3.

According to this embodiment, the primary positioner A, the secondary positioner B, and the tertiary positioner C are disposed in the identical side defined by the center M of the heat generators 60 in the longitudinal direction of the heater 22. Alternatively, any two of the primary positioner A, the secondary positioner B, and the tertiary positioner C may be disposed in the identical side defined by the center M of the heat generators 60 in the longitudinal direction of the heater 22, improving accuracy of positioning. For example, a combination of the primary positioner A and the secondary positioner B or a combination of the primary positioner A and the tertiary positioner C may be disposed in the identical side defined by the center M of the heat generators 60 in the longitudinal direction of the heater 22.

A description is provided of a positional relation between the primary positioner A and the driving force transmission gear 31 mounted on the pressure roller 21.

As illustrated in FIG. 22, according to this embodiment, in order to prevent the heater 22 and the heater holder 23 from interfering with the driving force transmission gear 31, the primary positioner A is disposed in a first side (e.g., a left side in FIG. 22) defined by the center M of the heat generators 60 in the longitudinal direction thereof and the driving force transmission gear 31 is disposed in a second side (e.g., a right side in FIG. 22) that is defined by the center M of the heat generators 60 and is opposite the first side in the longitudinal direction of the heat generators 60. Conversely, if the primary positioner A and the driving force transmission gear 31 are disposed in the identical side, the heater 22 and the heater holder 23 may interfere with the driving force transmission gear 31. For example, when the primary positioner A is mounted on the heater 22 and the heater holder 23, the primary positioner A enlarges the heater 22 and the heater holder 23 by a space occupied by the primary positioner A. Hence, as one lateral end of each of the heater 22 and the heater holder 23 extends and reaches the driving force transmission gear 31, the heater 22 and the heater holder 23 may interfere with the driving force transmission gear 31.

If the driving force transmission gear 31 has a decreased diameter, the driving force transmission gear 31 may receive an increased force from the gear disposed inside the body 103 of the image forming apparatus 100 and the rotation shaft of the pressure roller 21 may bend. To address this circumstance, the driving force transmission gear 31 preferably has an increased diameter. However, if the driving force transmission gear 31 has the increased diameter, the driving force transmission gear 31 is more susceptible to interference with the heater 22 and the heater holder 23. Additionally, like this embodiment, if the heater 22 is supported by the belt side face of the heater holder 23, that is disposed opposite the fixing nip N and the pressure roller 21 as illustrated in FIG. 2, a distance from the heater 22 to the driving force transmission gear 31 decreases, causing the driving force transmission gear 31 to be even more susceptible to interference with the heater 22 and the heater holder 23.

As a method for preventing interference, the rotation shaft of the pressure roller 21 elongates to shift and place the driving force transmission gear 31 at a position where the driving force transmission gear 31 does not interfere with the heater 22 and the heater holder 23, for example. However, if the rotation shaft of the pressure roller 21 elongates, rigidity against pressure (e.g., strength against bending) decreases between the pressure roller 21 and the fixing belt 20, causing the pressure roller 21 and the fixing belt 20 to be susceptible to bending. To address this circumstance, in order to attain rigidity of the pressure roller 21, the rotation shaft of the pressure roller 21 may have an increased diameter, causing another disadvantages of increased weight and manufacturing costs. Hence, the method for preventing interference by elongating the rotation shaft of the pressure roller 21 is not preferable.

To address this circumstance, according to this embodiment, as described above, the primary positioner A and the driving force transmission gear 31 are disposed in different sides, that is, the first side and the second side, defined by the center M of the heat generators 60 in the longitudinal direction thereof, respectively. Accordingly, even if the rotation shaft of the pressure roller 21 does not elongate, the heater 22 and the heater holder 23 are immune from interference with the driving force transmission gear 31.

As illustrated in FIG. 22, the electrodes 61 are also disposed in the first side that is defined by the center M of the heat generators 60 and is opposite the second side where the driving force transmission gear 31 is disposed in the longitudinal direction of the heat generators 60. Accordingly, heat generated as the driving force transmission gear 31 meshes with the gear disposed inside the body 103 of the image forming apparatus 100 does not increase the temperature of the electrodes 61 and the connector 70 coupled thereto. Consequently, the connector 70 is immune from contact with the electrodes 61 with decreased pressure and the like due to temperature increase.

In view of downsizing and reducing manufacturing costs of the heater 22, as described above, the positioning depression 22*a* is more preferable than the positioning projection 22*b* depicted in FIG. 17 as the positioner disposed in the heater 22. However, when either the positioning depression 22*a* or the positioning projection 22*b* is installed in the heater 22 as the positioner, the positioning depression 22*a* and the positioning projection 22*b* elongate the heater 22 and the heater holder 23 that incorporates the positioning projection 23*b* or the positioning depression 23*d*, causing the heater 22 and the heater holder 23 to interfere with the driving force transmission gear 31 similarly. To address this circumstance, in order to prevent the positioners disposed in the heater 22 and the heater holder 23, respectively, from causing the heater 22 and the heater holder 23 to interfere with the driving force transmission gear 31, the positioner disposed in the heater 22 is not limited to a depression (e.g., the positioning depression 22*a*), a projection (e.g., the positioning projection 22*b*), and a through hole (e.g., the through hole 22*a*W). Alternatively, a driving force transmitter disposed at one lateral end of the pressure roller 21 in the axial direction thereof may be pulleys over which a driving force transmission belt is stretched taut, a coupler, and the like instead of the driving force transmission gear 31.

A description is provided of a construction installed in the heater 22, that suppresses conduction of heat to the electrodes 61.

The above describes the construction in which the positioning depression 22*a* is disposed in the heater 22 to position the heater 22 in the longitudinal direction thereof. The positioning depression 22*a* is situated between a heat generating portion of the heater 22 where the heat generators 60 are situated and an electrode portion of the heater 22 where the electrodes 61 are situated in the longitudinal direction of the heater 22, thus serving as a thermal conduction restrictor that restricts conduction of heat from the heat generators 60 to the electrodes 61. For example, as illustrated in FIG. 7, a positioner portion of the heater 22 where the positioning depression 22*a* is situated defines a decreased cross section portion 22*z* that is smaller in cross-sectional area than the heat generating portion where the heat generators 60 are situated. The decreased cross section portion 22*z* suppresses conduction of heat from the heat generators 60 to the electrodes 61.

Accordingly, temperature increase of the connector 70 in contact with the electrodes 61 is suppressed, preventing decrease in pressure with which the connector 70 contacts the electrodes 61 due to temperature increase of the connector 70. Thus, according to this embodiment, even when the heat generators 60 generate heat, the decreased cross section portion 22*z* suppresses temperature increase of the electrodes 61 and the connector 70, retaining proper pressure with which the connector 70 contacts the electrodes 61 and therefore enhancing reliability. For example, like the embodiments, if the length of the heat generators 60 in the longitudinal direction thereof is greater than a width of a maximum size sheet P available in the fixing device 9 or if the heat generators 60 have the PTC property and the electric current flows in the longitudinal direction of the heater 22 through at least a part of the heat generators 60, the heat generators 60 generate an increased amount of heat in the non-conveyance span where the sheet P is not conveyed, increasing advantages of the decreased cross section portion 22*z*.

According to this embodiment, the positioning depression 22*a* also serves as a thermal conduction restrictor that restricts conduction of heat from the heat generators 60 to the electrodes 61, thus defining the decreased cross section portion 22*z*. Hence, the thermal conduction restrictor is not provided separately from the positioner, downsizing the heater 22. The decreased cross section portion 22*z* disposed in the heater 22 achieves suppressed conduction of heat from the heat generators 60 to the electrodes 61 without adding an extra element such as a heat radiator to the heater 22, downsizing the heater 22 advantageously.

The decreased cross section portion 22*z* may have an arbitrary shape as long as a cross-sectional area of the decreased cross section portion 22*z* is smaller than a cross-sectional area of the heat generating portion of the heater 22 where the heat generators 60 are disposed. For example, like an example illustrated in FIG. 18, the through hole 22*a*W may also define the decreased cross section portion 22*z*.

Figure 24:
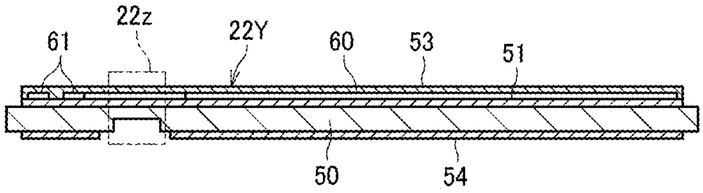
FIG. 24 is a cross-sectional view of a heater installable in the heating device depicted in FIG. 6, illustrating a decreased cross section portion produced by partially decreasing the thickness of a base layer of the heater.

FIG. 24 is a diagram of a heater 22Y incorporating the decreased cross section portion 22*z* disposed between the heat generating portion where the heat generators 60 are disposed and the electrode portion where the electrodes 61 are disposed. As illustrated in FIG. 24, the thickness of the base layer 50 decreases partially to define the decreased cross section portion 22*z*.

A description is provided of variations of the fixing device 9.

Figure 25:
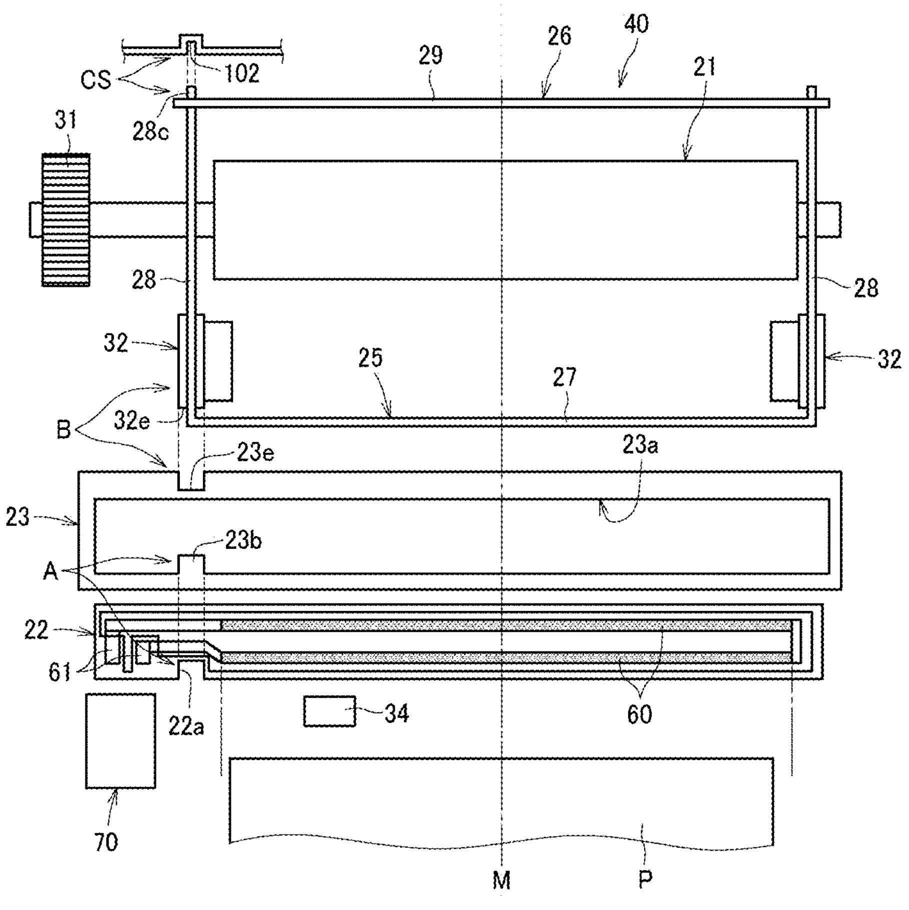
FIG. 25 is an exploded schematic diagram of a fixing device installable in the image forming apparatus depicted in FIG. 1 as a first variation of the fixing device depicted in FIG. 2.

FIG. 25 illustrates an example of the fixing device 9 in which, contrarily to the embodiments described above, the driving force transmission gear 31 is disposed in the identical side defined by the center M of the heat generators 60, where the primary positioner A, the secondary positioner B, and a tertiary positioner CS are disposed. In this case, the driving force transmission gear 31 is positioned with an improved accuracy, thus meshing with the gear disposed inside the body 103 of the image forming apparatus 100 precisely and thereby improving reliability of durability.

According to the example illustrated in FIG. 25, the tertiary positioner CS that positions the device frame 40 as the body of the fixing device 9 to the body 103 of the image forming apparatus 100 is constructed of an end 28*c* of one of the side walls 28 of the fixing device 9 and a hole 102 or a recess disposed in the body 103 of the image forming apparatus 100. The hole 102 engages the end 28*c* of the side wall 28. The primary positioner A, the secondary positioner B, and the tertiary positioner CS are situated at an identical position in the longitudinal direction of the heater 22 and overlap. The primary positioner A, the secondary positioner B, and the tertiary positioner CS are disposed at the identical position in the longitudinal direction of the heater 22, improving accuracy of positioning of the heater 22 with respect to the body 103 of the image forming apparatus 100 further.

Figure 26:
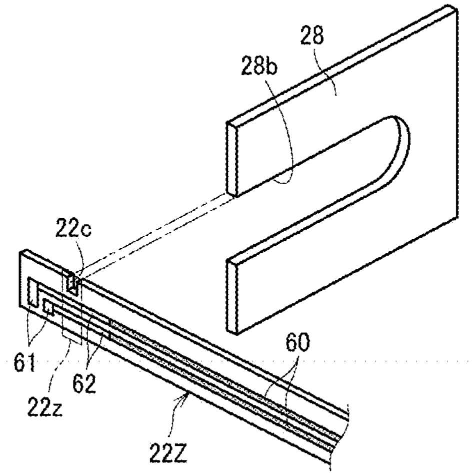
FIG. 26 is a perspective view of a heater installable in the fixing device depicted in FIG. 2, that is positioned directly by a side wall of the fixing device.
Figure 27:
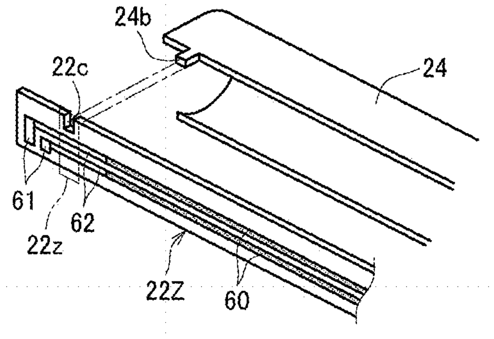
FIG. 27 is a perspective view of the heater depicted in FIG. 26, that is positioned directly by a stay incorporated in the fixing device depicted in FIG. 2.

FIG. 26 illustrates an example of a heater 22Z incorporating a recess 22*c* or a hole that engages the insertion recess 28*b*. As illustrated in FIG. 26, the recess 22*c* serving as a positioner disposed in the decreased cross section portion 22*z* of the heater 22Z directly engages the edges of the insertion recess 28*b* of the side wall 28, thus positioning the heater 22Z in a longitudinal direction thereof. FIG. 27 illustrates an example of a projection 24*b* mounted on the stay 24. As illustrated in FIG. 27, the projection 24*b* directly engages the recess 22*c* disposed in the decreased cross section portion 22*z* of the heater 22Z, thus positioning the heater 22Z in the longitudinal direction thereof. Thus, a counterpart that engages the positioner (e.g., the recess 22*c*) of the heater 22Z to position the heater 22Z may be the side wall 28 or the stay 24 other than the heater holder 23 described above. In this case, heat is conducted quickly from the heater 22Z to the side wall 28 and the stay 24 that contact the heater 22Z directly, suppressing temperature increase of the heater 22Z. As illustrated in FIGS. 26 and 27, the side wall 28 and the stay 24 directly contact the heater 22Z at a position between the heat generators 60 and the electrodes 61 in the longitudinal direction of the heater 22Z, suppressing conduction of heat from the heat generators 60 to the electrodes 61 further. The side wall 28 and the stay 24 are made of a material that has a thermal conductivity greater than a thermal conductivity of the heater holder 23, preferably, a material that has a thermal conductivity greater than a thermal conductivity of the base layer 50 of the heater 22Z, suppressing temperature increase of the heater 22Z effectively.

Figure 28:
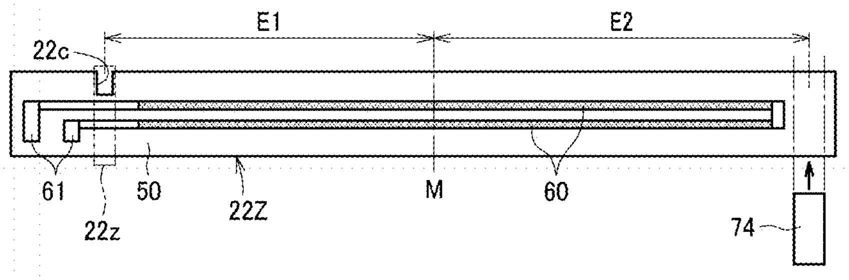
FIG. 28 is a plan view of the heater depicted in FIG. 26, illustrating a positioner disposed at one lateral end of the heater and an enhanced thermal conductor disposed at another lateral end of the heater.

However, if heat generated by the heater 22Z is conducted quickly from one lateral end of the heater 22Z in the longitudinal direction thereof to the side wall 28 and the stay 24, a difference in an amount of heat radiation may increase between one lateral end and another lateral end of the heater 22Z in the longitudinal direction thereof, causing the temperature of the heater 22Z to be uneven between one lateral end and another lateral end of the heater 22Z in the longitudinal direction thereof. To address this circumstance, for example, as illustrated in FIG. 28, an enhanced thermal conductor 74 having a thermal conductivity greater than a thermal conductivity of the base layer 50 is disposed at another lateral end of the heater 22Z in the longitudinal direction thereof, that is opposite one lateral end of the heater 22Z where the recess 22*c* disposed in the decreased cross section portion 22*z* is situated. Accordingly, the enhanced thermal conductor 74 improves conduction or radiation of heat also at another lateral end of the heater 22Z in the longitudinal direction thereof, that is opposite one lateral end of the heater 22Z where the heater 22Z contacts the side wall 28 and the stay 24 directly, thus decreasing uneven temperature between one lateral end and another lateral end of the heater 22Z in the longitudinal direction thereof. In order to decrease uneven temperature effectively, a distance E1 from the center M of the heat generators 60 to the recess 22*c* disposed in the decreased cross section portion 22*z* and a distance E2 from the center M of the heat generators 60 to the enhanced thermal conductor 74 in the longitudinal direction of the heater 22Z are different by 2 mm or smaller or, preferably, are equivalent such that the distance E1 is symmetrical with the distance E2. The enhanced thermal conductor 74 may be a flat spring or the like and may also serve as a sandwiching member that sandwiches and holds the heater 22Z and the heater holder 23 together. Accordingly, the enhanced thermal conductor 74, as a single element, achieves two functions, that is, thermally equalizing the heater 22Z and preventing the heater 22Z from dropping off, thus reducing manufacturing costs.

Figure 29:
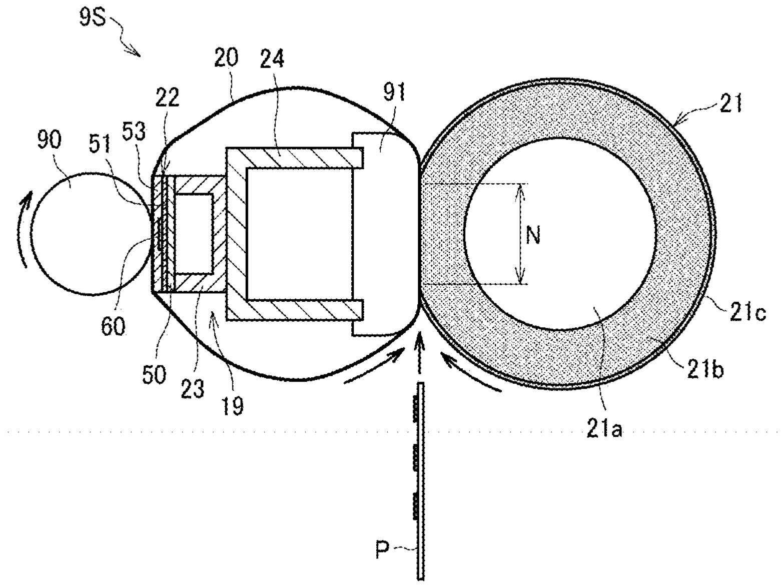
FIG. 29 is a schematic cross-sectional view of a fixing device installable in the image forming apparatus depicted in FIG. 1 as a second variation of the fixing device depicted in FIG. 2.
Figure 30:
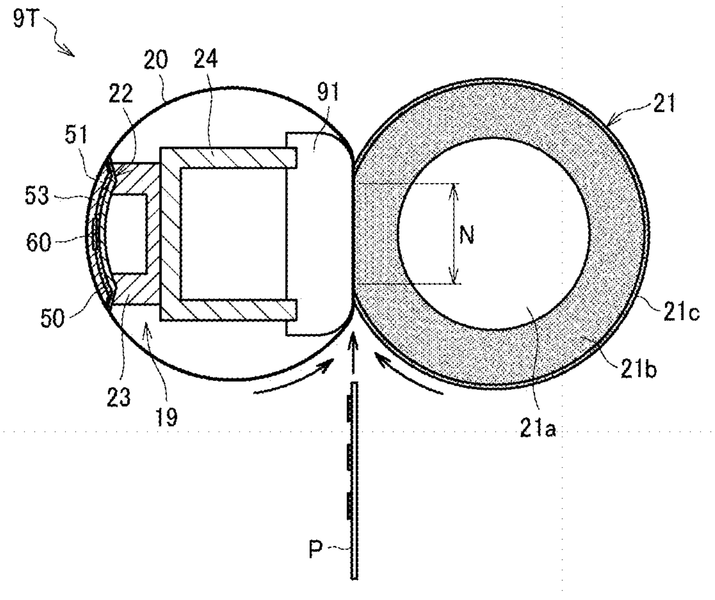
FIG. 30 is a schematic cross-sectional view of a fixing device installable in the image forming apparatus depicted in FIG. 1 as a third variation of the fixing device depicted in FIG. 2.
Figure 31:
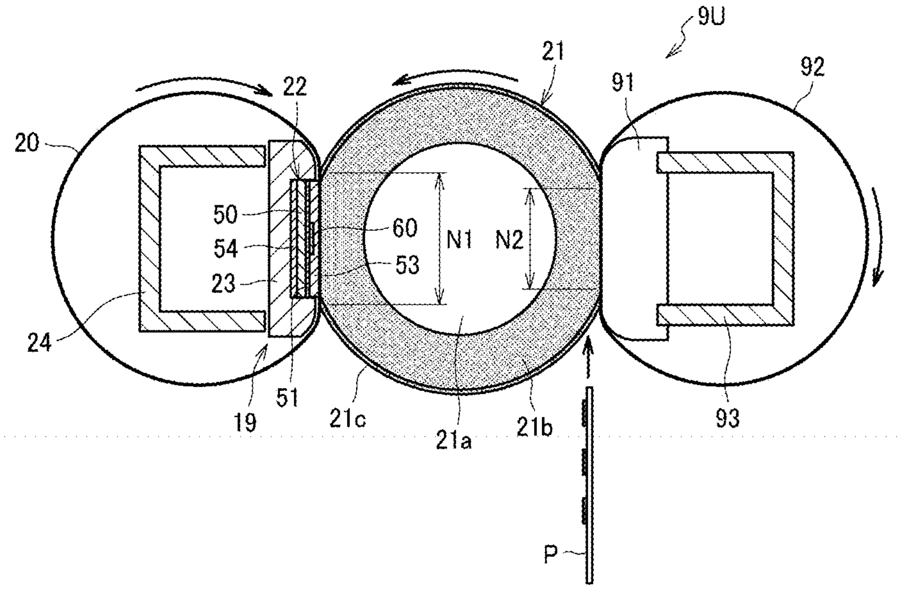
FIG. 31 is a schematic cross-sectional view of a fixing device installable in the image forming apparatus depicted in FIG. 1 as a fourth variation of the fixing device depicted in FIG. 2.

The embodiments of the present disclosure are applicable to fixing devices 9S, 9T, and 9U illustrated in FIGS. 29 to 31, respectively, other than the fixing device 9 described above. The following briefly describes a construction of each of the fixing devices 9S, 9T, and 9U depicted in FIGS. 29 to 31, respectively.

A description is provided of the construction of the fixing device 9S. As illustrated in FIG. 29, the fixing device 9S includes a pressing roller 90 disposed opposite the pressure roller 21 via the fixing belt 20. The pressing roller 90 and the heater 22 sandwich the fixing belt 20 so that the heater 22 heats the fixing belt 20. On the other hand, a nip forming pad 91 serving as a nip former is disposed inside the loop formed by the fixing belt 20 and disposed opposite the pressure roller 21. The stay 24 supports the nip forming pad 91. The nip forming pad 91 and the pressure roller 21 sandwich the fixing belt 20 and define the fixing nip N.

A description is provided of the construction of the fixing device 9T. As illustrated in FIG. 30, the fixing device 9T does not include the pressing roller 90 described above with reference to FIG. 29. In order to attain a contact length for which the heater 22 contacts the fixing belt 20 in the circumferential direction thereof, the heater 22 is curved into an arc in cross section that corresponds to a curvature of the fixing belt 20. Other construction of the fixing device 9T is equivalent to that of the fixing device 9S depicted in FIG. 29.

A description is provided of the construction of the fixing device 9U. As illustrated in FIG. 31, the fixing device 9U includes a pressure belt 92 in addition to the fixing belt 20. The pressure belt 92 and the pressure roller 21 form a fixing nip N2 serving as a secondary nip separately from a heating nip N1 serving as a primary nip formed between the fixing belt 20 and the pressure roller 21. For example, the nip forming pad 91 and a stay 93 are disposed opposite the fixing belt 20 via the pressure roller 21. The pressure belt 92 that is rotatable accommodates the nip forming pad 91 and the stay 93. As a sheet P bearing a toner image is conveyed through the fixing nip N2 formed between the pressure belt 92 and the pressure roller 21, the pressure belt 92 and the pressure roller 21 fix the toner image on the sheet P under heat and pressure. Other construction of the fixing device 9U is equivalent to that of the fixing device 9 depicted in FIG. 2.

The above describes the constructions of various fixing devices (e.g., the fixing devices 9, 9S, 9T, and 9U) that incorporate the heaters (e.g., the heaters 22, 22S, 22P, 22T, 22U, 22V, 22W, 22X, 22Y, and 22Z). However, the heaters according to the embodiments of the present disclosure are also applicable to devices other than the fixing devices. For example, the heaters according to the embodiments of the present disclosure are also applicable to a dryer installed in an image forming apparatus employing an inkjet method. The dryer dries ink applied onto a sheet. Alternatively, the heaters according to the embodiments of the present disclosure may be applied to a coater (e.g., a laminator) that thermally presses film as a coating member onto a surface of a sheet (e.g., paper) while a belt conveys the sheet. The heating device (e.g., the heating devices 19 and 99) according to the embodiments of the present disclosure is not limited to a belt heating device (e.g., the heating device 99) that heats a belt and may be a heating device (e.g., the heating device 19) that does not incorporate the belt.

This patent application is based on and claims priority pursuant to 35 U.S.C. § 119(a) to Japanese Patent Application No. 2018-184393, filed on Sep. 28, 2018, in the Japan Patent Office, the entire disclosure of which is hereby incorporated by reference herein.

REFERENCE SIGNS LIST

9 Fixing device
19 Heating device
20 Fixing belt (belt)
21 Pressure roller (opposed member)
22 Heater (heating member)
22*a* Positioning depression (positioner)
22*x* Downstream side face in rotation direction of belt
23 Heater holder (holder)
23*b* Positioning projection (positioner)
25 First device frame
26 Second device frame
28 Side wall
32 Support (device frame)
40 Device frame
60 Heat generator
61 Electrode
62 Feeder
103 Body of image forming apparatus
A Primary positioner
B Secondary positioner
C Tertiary positioner
G Positioning margin of sheet
M Center of heat generator
N Fixing nip

The invention claimed is:

1. A heating device, comprising:
a heater including a heat generator;
a holder to hold the heater; and
a positioner to position the heater relative to the holder in a longitudinal direction of the heater,
wherein:
the heater includes a base layer, a first insulating layer, a conductor layer, a second insulating layer, and a third insulating layer,
the first insulating layer, the conductor layer, and the second insulating layer, are layered in this order on a first side of the base layer facing a fixing nip, and the third insulating layer is layered on a second side of the base layer opposite the first side,
the conductor layer includes the heat generator, and
the heater includes a region not having the third insulating layer at a position of the positioner,
the heating device further comprises:
a frame to support the holder;
a secondary positioner to position the holder and the frame in the longitudinal direction of the heater; and
a tertiary positioner to position the frame and a body of an image forming apparatus in the longitudinal direction of the heater,
wherein the positioner and one of the secondary positioner and the tertiary positioner are disposed on an identical side defined by a center of the heat generator in the longitudinal direction of the heater, and
wherein the positioner and the one of the secondary positioner and the tertiary positioner do not have a corresponding positioner disposed on an opposite side of the heat generator which is opposite to said identical side relative to the center of the heat generator.

2. The heating device according to claim 1, wherein:
the heater includes the positioner.

3. The heating device according to claim 1, further comprising:
a pair of side walls disposed on opposite sides defined by the center of the heat generator in the longitudinal direction of the heater, wherein one of the pair of side walls includes the secondary positioner and the tertiary positioner.

4. The heating device according to claim 1, wherein the heater is at least partially made of metal.

5. The heating device according to claim 1, wherein the heat generator has a positive temperature coefficient property, and wherein the heat generator is at least partially configured so that an electric current flows in the longitudinal direction of the heater.

6. The heating device according to claim 1, wherein the positioner and the secondary positioner are disposed at an identical position in the longitudinal direction of the heater.

7. The heating device according to claim 1, wherein the positioner and the tertiary positioner are disposed at an identical position in the longitudinal direction of the heater.

8. A belt heating device, comprising:

an endless belt to rotate in a rotation direction; and the heating device according to claim 1, wherein the heater includes a laminated heater to contact and heat the endless belt.

9. The belt heating device according to claim 8, wherein the laminated heater includes a downstream face in the rotation direction of the endless belt, the downstream face to contact the holder to position the laminated heater with respect to the holder in a direction perpendicular to a longitudinal direction of the laminated heater.

10. The heating device according to claim 9, wherein the laminated heater further includes an upstream face in the rotation direction of the endless belt, the upstream face disposed with the positioner.

11. The belt heating device according to claim 8, wherein the endless belt is to align and convey a recording medium along a positioning margin disposed at one lateral end of the endless belt in a width direction of the endless belt, and wherein the positioning margin and the positioner are disposed on an identical side defined by a center of the heat generator in the longitudinal direction of the heater.

12. A fixing device comprising the belt heating device according to claim 8, wherein the belt heating device is to fix an image on a recording medium.

13. An image forming apparatus comprising:

the fixing device according to claim 12; and an image forming device to form the image on the recording medium.

14. An image forming apparatus, comprising:

an image forming device to form an image on a recording medium; and the belt heating device according to claim 8 to heat the image on the recording medium.

15. An image forming apparatus, comprising:

an image forming device to form an image on a recording medium; and the heating device according to claim 1 to heat the image on the recording medium.

16. The heating device according to claim 1, wherein:

each of the positioner, the secondary positioner, and the tertiary positioner does not have a corresponding positioner disposed on the opposite side of the heat generator.

* * * * *